US010870200B2

(12) United States Patent
Kayser et al.

(10) Patent No.: US 10,870,200 B2
(45) Date of Patent: Dec. 22, 2020

(54) METHODS AND APPARATUS FOR TUBE FABRICATION

(71) Applicant: Massachusetts Institute of Technology, Cambridge, MA (US)

(72) Inventors: Markus Kayser, Burgwedel (DE); Levi Cai, Seattle, WA (US); Nassia Inglessis, London (GB); Sara Falcone, Cambridge, MA (US); Neri Oxman, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 149 days.

(21) Appl. No.: 16/260,149

(22) Filed: Jan. 29, 2019

(65) Prior Publication Data

US 2019/0232486 A1  Aug. 1, 2019

Related U.S. Application Data

(60) Provisional application No. 62/623,002, filed on Jan. 29, 2018.

(51) Int. Cl.
*B25J 9/14* (2006.01)
*B29C 71/02* (2006.01)
(Continued)

(52) U.S. Cl.
CPC ............... *B25J 9/142* (2013.01); *B25J 5/04* (2013.01); *B29B 15/10* (2013.01); *B29C 70/30* (2013.01);
(Continued)

(58) Field of Classification Search
CPC .. B25J 9/142; B25J 5/04; B29C 71/02; B29C 70/30; B29C 2035/0827; B29B 15/10
(Continued)

(56) References Cited

U.S. PATENT DOCUMENTS 4,750,960 A  6/1988 Bubeck
4,867,834 A  9/1989 Alenskis et al.
(Continued)

OTHER PUBLICATIONS

Shen, Frank C. "A filament-wound structure technology review." Feb. 8, 1995. Materials Chemistry and Physics vol. 42, pp. 96-100. (Year: 1995).*
(Continued)

*Primary Examiner* — Philip C Tucker
*Assistant Examiner* — Vicki Wu
(74) *Attorney, Agent, or Firm* — Stephen R. Otis

(57) ABSTRACT

A team of robots may fabricate a tubular structure. Each robot may fabricate a tube by winding resin-covered fiber around an inflated, cylindrical mandrel of the robot. The resin may cure, resulting in a hardened tube segment The robot may extend the tube by fabricating additional segments of the tube, one segment at a time. After a first segment cures, the mandrel may deflate, then the robot may move up inside the tube, then the mandrel may inflate, and the robot may begin fabricating another tube segment. After completing a tube segment, the robot may tilt relative to that segment, before starting the next segment. By doing so, the robot may cause the tube to be curved. A computer may guide the team of robots during fabrication of the tubes, by executing a flocking algorithm. The algorithm may prevent collisions with already fabricated tube segments.

14 Claims, 17 Drawing Sheets

(51) Int. Cl.
   *B29B 15/10* (2006.01)
   *B25J 5/04* (2006.01)
   *B29C 70/30* (2006.01)
   *B29C 35/08* (2006.01)
(52) U.S. Cl.
   CPC ...... *B29C 71/02* (2013.01); *B29C 2035/0827* (2013.01)
(58) Field of Classification Search
   USPC ........................................................ 156/242
   See application file for complete search history.

(56) References Cited

U.S. PATENT DOCUMENTS

| | | | |
|---|---|---|---|
| 5,086,983 A | | 2/1992 | Darrieux |
| 5,266,137 A | * | 11/1993 | Hollingsworth ...... B29C 53/824 156/156 |
| 5,632,940 A | | 5/1997 | Whatley |

OTHER PUBLICATIONS

Horodinca, M., et al., A simple architecture for in-pipe inspection robots, published in Proceedings of the International Colloquium on Autonomous and Mobile Systems, 2002.
Shen, F., A filament-wound structure technology overview, published in Materials Chemistry and Physics, vol. 42, Issue 2, pp. 96-100, Nov. 1995.

* cited by examiner

METHODS AND APPARATUS FOR TUBE FABRICATION

RELATED APPLICATIONS

This application claims the benefit of U.S. Provisional Application No. 62/623,002 filed Jan. 29, 2018 (the "Provisional").

FIELD OF TECHNOLOGY

The present invention relates generally to tube fabrication.

COMPUTER PROGRAM LISTING

The following nine computer program files are incorporated by reference herein: (1) Airpump_cpp.txt with a size of about 2 KB; (2) Airpump_h.txt with a size of about 1 KB; (3) Fiberbot_ino.txt with a size of about 45 KB; (4) FiberbotHeaders_h.txt with a size of about 8 KB; (5) FiberbotUtils_h.txt with a size of about 5 KB; (6) PIDMotor_cpp.txt with a size of about 4 KB; (7) PIDMotor_h.txt with a size of about 3 KB; (8) StepperUtils_h.txt with a size of about 3 KB; and (9) swarmGUI3_py.txt with a size of about 29 KB. Each of these nine files were created as an ASCII .txt file on Dec. 2, 2012.

SUMMARY

In exemplary implementations of this invention, a robot fabricates a tube by winding resin-coated fiber around a cylindrical mandrel of the robot. The resin-coated fiber may thus be deposited around the mandrel in a tubular shape. The robot may perform the winding by revolving a nozzle around the robot, while the resin-coated fiber exits the nozzle.

After the resin-coated fiber is deposited, the resin may cure, resulting in a hardened segment of a tube. The hardened segment may comprise a composite material that includes fiber and cured resin. The resin may be cured by exposure to UV (ultraviolet) light. The robot may include UV LEDs (light-emitting diodes) to facilitate the UV curing of the resin.

The robot may include an inflatable mandrel. When inflated, the mandrel may comprise a cylindrical form around which the resin-coated fiber is wound. After the resin cures, the mandrel may deflate and detach from the hardened tube segment. The mandrel may be translucent, and thus may allow UV light from the UV LEDs to pass through the mandrel and cure the UV-curable resin.

The robot may extend the length of the tube by fabricating additional segments of the tube, one segment at a time. After the mandrel deflates and detaches from a hardened segment, the robot may move up the tube while still partially inside the tube. The robot may then inflate the mandrel again and begin fabrication of the next segment.

The tube segments may overlap to some extent. For instance, after a first segment of tube has hardened, the robot may start fabricating a second segment of the tube, in such a way that resin-coated fiber for the second segment is deposited both around the mandrel and around the first segment.

The robot may include a drive mechanism to move the robot as a whole, relative to a segment of a tube that the robot is fabricating, or relative to a base structure that supports or will support the tube. The drive mechanism may include motors, wheels, and spring-tensioned tracks around the wheels. The motors may actuate motion of the wheels, which in turn may actuate motion of the tracks around the wheels. The spring-tensioned tracks may press against an interior wall of the tube and may thus provide traction for the robot, while the robot moves relative to the tube. Furthermore, the spring-tensioned tracks may adapt to variations in radius of the fabricated tube.

After completing a specific tube segment, the robot may tilt relative to the central axis of the specific tube segment. The robot may then fabricate the next tube segment (as an extension of the tube), while maintaining this tilted orientation relative to the central axis of the specific tube segment. The robot may tilt itself by simultaneously rotating tracks on opposite sides of the robot, in such a way that one track moves in one direction (e.g., up) along the length of the tube and the other track moves in the opposite direction (e.g., down) along the length of the tube.

By tilting at different angles after completing tube segments, the robot may cause the tube to be curved in two or three dimensions (or to approximate the shape of a curve in two or three dimensions).

The robot may include a winding mechanism. The winding mechanism may comprise a wind arm, a nozzle and a resin feed. The resin feed may deliver resin to the nozzle. The resin feed may have a tubular shape. Resin may be delivered to the nozzle by moving inside an elongated inner hollow of the resin feed. The resin feed may block UV light, to prevent resin from curing while still in the resin feed. The robot may include motors that cause the winding mechanism to undergo rotation (or revolution) or translation.

Rotation/Winding: For instance, a motor may actuate the wind arm to rotate about the central axis of the robot (and of the mandrel). The wind arm may support the resin feed. The resin feed, in turn, may support the nozzle. While the wind arm rotates about the central axis of the robot (and of the mandrel), the resin feed and nozzle may revolve around the central axis of the robot (and of the mandrel). The nozzle (and a portion of the resin feed) may be more radially distant from the central axis of the robot than is the exterior surface of the mandrel. While the nozzle revolves around the mandrel, resin-coated fiber may exit the nozzle and be deposited on the mandrel (or on fiber that was previously deposited). Thus, the nozzle may wind the fiber around the mandrel.

Translation: The robot may include a motor and linear rail that cause the winding mechanism to translate in a direction parallel to the central axis of the robot (e.g., up or down, if the central axis of the robot is vertical). This translation may occur while resin-coated fiber is exiting the nozzle, and thus may cause fiber to be wound around the mandrel at different positions along the length of the mandrel. For instance, if central axis of the mandrel is vertical, then translation of the nozzle up and down may cause the resin-coated fiber to be wound around the mandrel at different vertical positions relative to the mandrel.

A base (e.g., a steel tube) may support the composite tube (and also support the robot while the robot fabricates the composite tube). A container that contains resin may be housed in the base. Likewise, a pump that pumps resin may be housed in the base. The pump may pump resin through one or more tubes into the nozzle. A spool of the fiber may also be located in or adjacent to the base. The fiber may be pulled up into the robot and then into the nozzle. The fiber may be coated with resin while in the nozzle. Resin-coated fiber may exit the nozzle and be wound around the mandrel. The fiber may comprise fiberglass.

In some cases, the robot is partially inside a tube during the robot's fabrication of the tube.

In some cases, a tubular structure comprising multiple tubes is constructed. The tubes may be simultaneously fabricated (i.e., fabricated in parallel) by multiple robots, one robot per tube. Alternatively, the tubes may be sequentially fabricated by single robot, one tube at a time. The tubular structure may comprise intertwined or interwoven tubes. The tubular structure may support its own weight in addition to the weight of other objects.

In some cases, a central computer provides overall control for fabrication of multiple tubes. To do so, the computer may perform a modified Reynold's flocking algorithm to guide the robots during fabrication. This algorithm may take into account any tubes (or portions of tubes) that have already been fabricated by the robot(s). The algorithm may cause the tubes to be fabricated in such a way that each of the tubes approaches, but does not touch, a shared target point. Furthermore this algorithm may prevent (a) collisions between robots and (b) collisions between a robot and a tube fabricated by another robot.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

Figure 1:
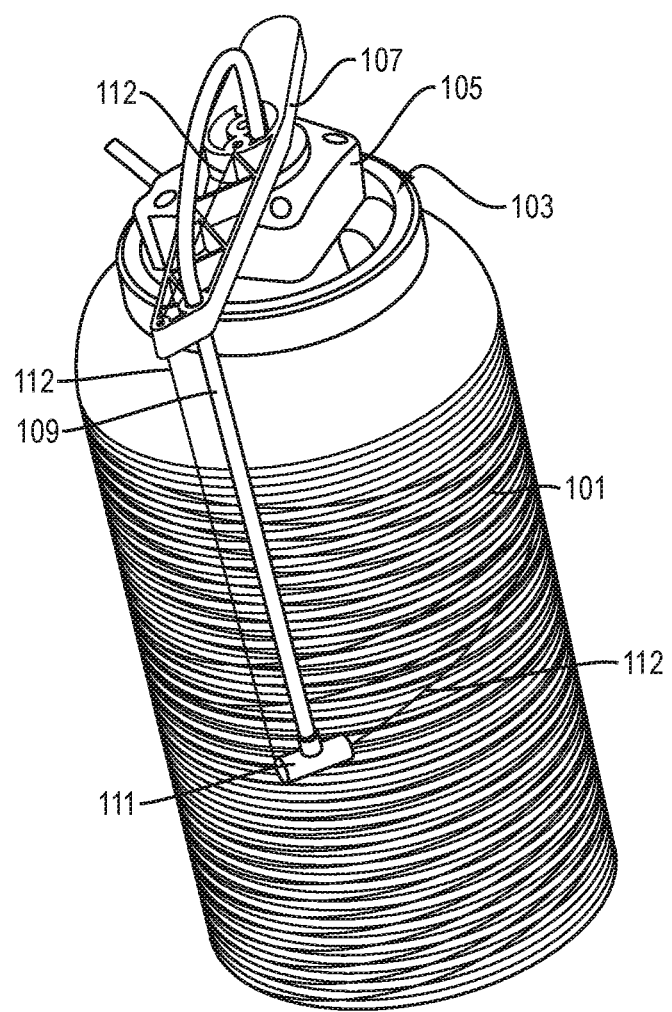
FIG. 1 shows a robot fabricating a tube by depositing fiber.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

General

In illustrative implementations of this invention, a team of identical robots works in parallel to build different tubes in a structure much larger than the robots themselves from raw, homogeneous materials. The tubes may be load-bearing. By winding fiber and resin around themselves, each robot may create an independent composite tube that it can climb and extend. The robots' trajectories may be controlled to construct intertwining tubes that result in a computationally-derived woven architecture. This end-to-end system may be scalable, allowing additional robots to join the system without substantially increasing design complexity or fabrication time. For instance, in a prototype of this invention, robots constructed a 4.5 meter tall tubular composite structure in an outdoor environment in under 12 hours.

In illustrative implementations, each robot is identical and comprises a filament-winding system that deposits fiber and UV-curing resin to build a single, self-supporting composite tube via continuous fabrication. The fiber may comprise a fiberglass thread. Individual tubes may be placed side-by-side and interwoven to create larger architectural structures. Each robot may crawl and orient itself along a tube as it fabricates the tube, enabling production of tubes with controlled curvature, much longer than each robot. For instance, each tube may be tens of times longer than the robot that fabricated it.

In illustrative implementations, each robot works independently and has an individual material power and material feed. The robots may avoid collision by following their pre-planned, collision-free trajectories. In some cases, the system or users may add, remove, or reuse robots mid-fabrication. For instance, by increasing the number of robots, each of which fabricates a tube, the number of tubes being fabricated simultaneously may be increased. This in turn may allow the number of tubes in a multi-tube structure to be increased without increasing the fabrication time.

In some implementations, each robot has a wind arm, nozzle, inflatable membrane and differential drive system. The wind arm may pull fiber (e.g., fiberglass fiber) and UV-curing resin from material storage in or near a base of the tube. These materials may be drawn through the tube, and rotationally deposited on the outside of the inflatable membrane. The wind arm may be finely controlled to tune the thickness, material deposition rate, and patterning of the wetted thread. The inflatable membrane may act as a contractible mandrel that reversibly increases and decreases in diameter, allowing the robot to delaminate from the cured composite. The mandrel may be inflated as the robot winds a segment of the tube. After the segment is fully wound the mandrel may deflate, then the drive system may move the robot up, tilt to a desired orientation, and repeat.

The drive system may allow the robot to move up and down the structure and orient itself in the tube to extend the tubes and create curvature, respectively. The robot may localize and follow trajectories by using feedback from an on-board IMU (inertial measurement unit) and encoders that are mounted to the drive system. This localization data may be fed back to a central computer, which may, based on the feedback, adjust the target design of tubes being fabricated. This adjustment may be performed in real time. Each robot may fabricate its own, independent self-supporting tube.

FIG. 1 shows a robot fabricating a tube, around a portion of the robot, by depositing fiber. In FIG. 1, a segment of a tube 101 is shown. The tube 101 may comprise a fiber-resin composite material. In FIG. 1, the majority of the robot is inside tube 101. A portion of the robot may extend outside the tube. This protruding portion of the robot may include a nozzle 111, a wind arm 107, a tube 109, at least part of an electric motor 105, and limit switch 103. Tube 109 may comprise a tubular resin feed that is configured to deliver resin to nozzle 111. Electric motor 105 may impart rotational movement to wind arm 107 (and thus cause tube 109 and nozzle 111, which are supported by wind arm 107, to revolve around the mandrel). As nozzle 101 rotates around the tube, fiber 112 may be drawn into nozzle 111, be coated with resin in nozzle 111, exit nozzle 111 and then be wound around the mandrel (or around a fiber-resin composite that has already been deposited on the mandrel). Fiber 112 may comprise a filament or thread of fiber.

After being deposited, the resin-coated fiber may cure. The cured resin-coated fiber: (a) may be hard and solid; (b) may be attached to adjacent fibers in a fixed position relative to those adjacent threads and to the rest of the tube; and (c) may increase the size of the resin-fiber composite tube (e.g., by extending the length of the tube or by increasing the thickness of a wall of the tube). Fiber 112 may be drawn into nozzle 111 (where it is then coated with resin) because: (a) the deposited portion of fiber 112 that has been wound around the tube is in a fixed position relative to the tube, and (b) nozzle 111 is revolving around the tube and the mandrel.

In some cases, the winding pattern of the fiber that is wound around the mandrel is defined as the angle of a single strand of fiber relative to the central axis of the mandrel, and can be controlled by:

$$\tan \theta_{des} = \frac{d_l}{d_r}$$

where $\theta_{des}$ is the desired pattern angle, $d_l$ is the linear speed, and $d_r$ is the rotational speed, both in mm/sec. In some cases, $d_r$ is set equal to 1, and both quantities are scaled to the maximum linear speed $d_{lmax}$ to get a desired pattern at the fastest wind speed:

$$d_r = \frac{d_{lmax}}{d_l}$$

By changing these parameters, single tube segments may be fabricated with a wide range of winding patterns.

Figure 2:
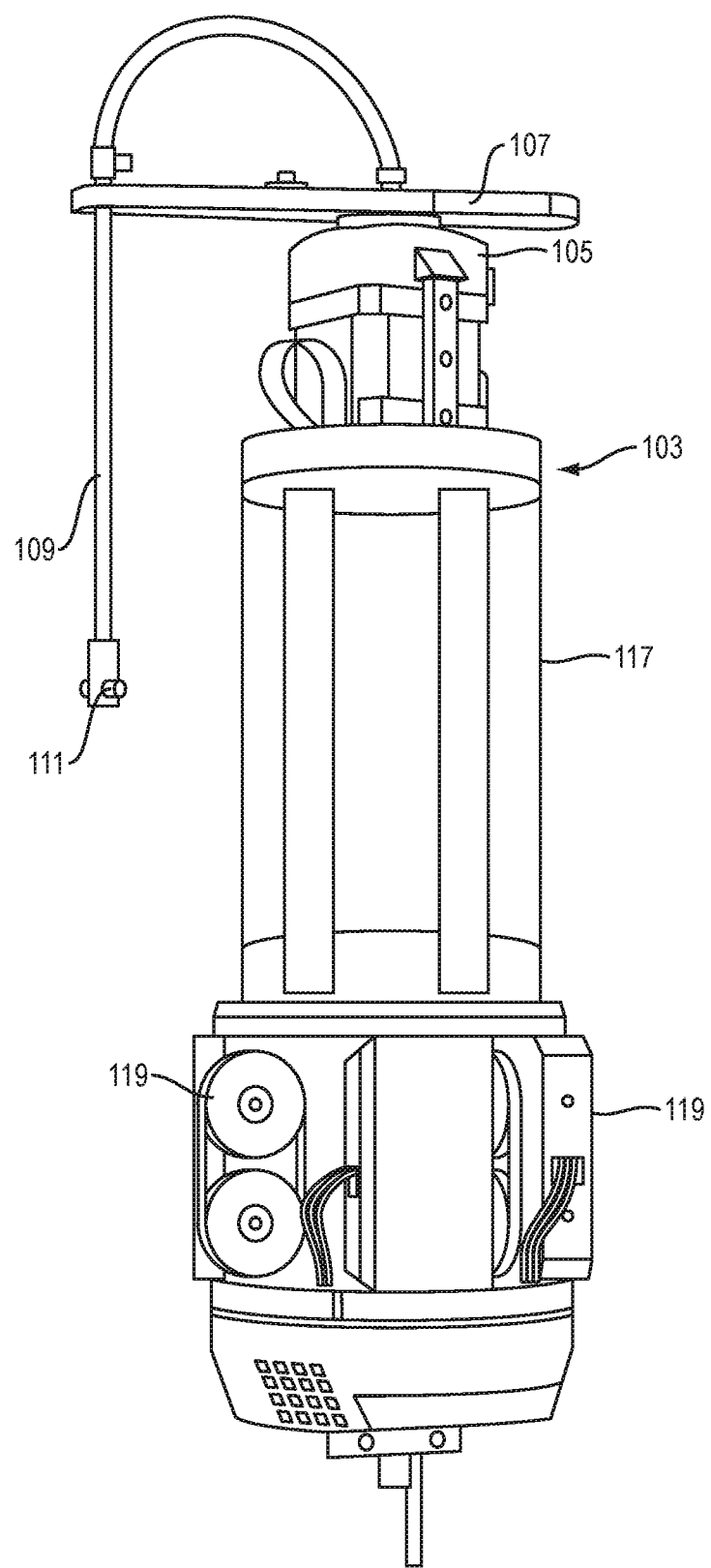
FIG. 2 shows hardware components of a robot.

FIG. 2 shows hardware components of a robot, in an illustrative implementation of this invention. In FIG. 2, mandrel 117 is inflatable and deflatable. Mandrel 117 may be inflated while resin-coated fiber thread is being wound around the mandrel and while it is curing. After the resin-coated thread cures into a hardened, composite segment of the tube, mandrel 117 may deflate (and thus detach from the hardened segment of the tube) and the robot may move up or down in the segment or may tilt itself relative to the segment.

In FIG. 2, motion actuators 119 actuate motion of the robot (e.g., to move the robot up or down a tube while the robot is partially within the tube, or to tilt the robot relative to the longitudinal axis of the most segment of the tube). For instance, motion actuators 119 may comprise motor-driven treads that press against an internal wall of the tube for traction.

FIGS. 3A, 4A, 4B, 4C and 4D show a system in which a robot fabricates multiple segments of a tube, one segment at a time.

Figures 3A, 3B:
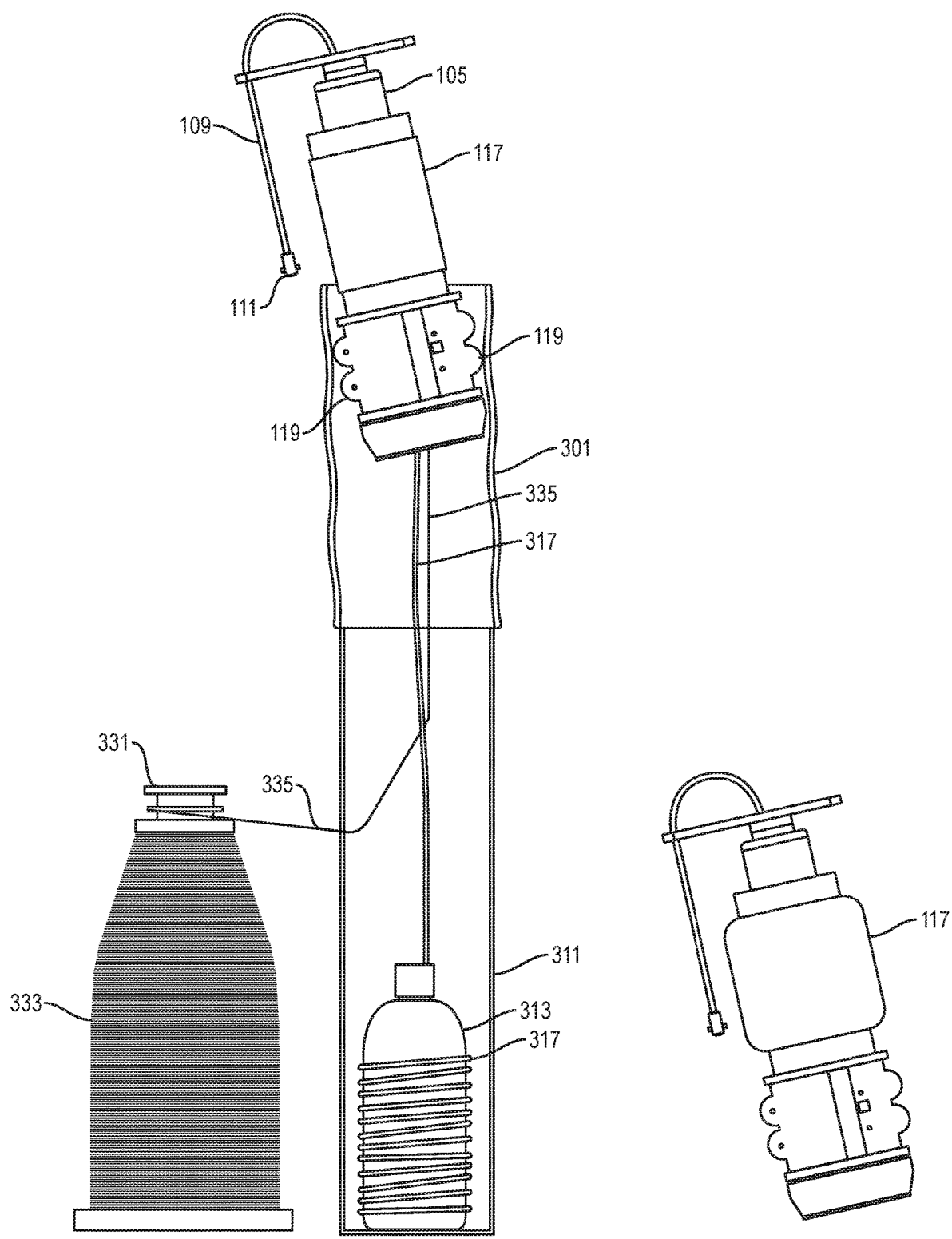
FIGS. 3A, 4A, 4B, 4C and 4D show a system in which a robot fabricates multiple segments of a tube, one segment at a time.
FIG. 3B shows a robot with an inflated mandrel.

In FIG. 3A, the robot has completed fabrication of a segment 301 of a tube, and has then reoriented itself at a tilt relative to the cylindrical axis of tube segment 301. As a result of this tilt (of the robot relative to tube segment 301), the next tube segment that the robot builds may be tilted relative to tube segment 301. Tilting the tube segments relative to each other and causing adjacent tube segments to partially overlap each other may cause the tube to have an overall shape that: (a) is curved in two or three dimensions; or (b) approximates a curve in two or three dimensions. In some cases, this curved (or approximately curved) overall shape of the tube is achieved even though each individual segment of the tube has an approximately straight centerline (e.g., has an inner surface that approximates a right circular cylinder).

In FIG. 3A, tube segment 301 rests on base 311. Base 311 may have a cylindrical sidewall, may comprise metal, and may be re-usable. Resin may be stored in container 313, which may in turn be housed inside base 311. Tube 317 may deliver resin from container 313 to the robot.

In FIG. 3A, raw fiber 333 may be stored on a spool 331 near base 311. The fiber may be pulled up toward the robot inside conduit 335. In some cases, the fiber comprises fiberglass thread.

In some cases, a tube is fabricated in such a manner that the fabricated tube rests on a reusable pre-fabricated tubular base. The tubular base may comprise a strong, rigid material (e.g., steel) and may be anchored to the ground (e.g., with stakes). Thus, the tubular base may provide a strong, stable support for the tube being fabricated. The tube may be strong enough to support both its own weight and the weight of the robot (which is partially inside the tube while fabricating the tube). The strength of each tube segment may be affected by the fiber-to-resin ratio, fiber patterning, and thickness within the segment. The adhesion between segments may affect the strength of a completed tube.

In FIG. 3A, wind arm 107 may cause resin-coated thread to be wound around the mandrel (or around thread already deposited on the mandrel). Movement of the wind arm 107 may control the fiber patterning and thickness of a tube segment. Wind arm 107 may steer fiber 112 over a portion of the path whereby the fiber travels to nozzle 111. Also, the wind arm 107 may support tube 109, which delivers resin to nozzle 111. The wind arm 107 may rotate about an axis that is parallel to a longitudinal axis of the robot and that intersects the wind arm. Rotation of the wind arm may in turn cause nozzle 111 to move repeatedly around mandrel 117 while resin-coated fiber exiting the nozzle is deposited on the mandrel (or on fiber that has been previously deposited on the mandrel).

While resin-coated fiber 112 is being deposited to fabricate the first segment of the tube, a portion of the mandrel may be inside tubular base 311, thereby fixing the robot's position relative to the tubular base while the first segment is being fabricated. While resin-coated fiber 112 is being deposited to fabricate a new segment of the tube (after at least one segment has been already been completed), a portion of the mandrel may be inside the most recently fabricated segment of the tube, thereby fixing the robot's position relative to the most recent segment while the new segment is being fabricated.

By overlapping with a previous tube segment, the mandrel may cause the robot to remain in a fixed position relative to the previous tube segment, while the robot fabricates a new tube segment. The mandrel may be inflatable and may thereby an adjustable radius so that various diameter tubes can be created. Additionally, by deflating (and thus shrinking the radius of) the mandrel, the mandrel may detach from the cured structure, allowing the robot to move along the length of the tube. The mandrel may increase its radius again to fix itself in place and fabricate a new tube segment.

In some cases, the fabrication sequence for each segment of the tube is to (1) inflate the mandrel to proper segment diameter and anchor it to the existing tube, (2) wind the composite, (3) cure the composite, (4) deflate the mandrel to free the robot from the structure, and (5) drive the robot upwards and (6) orient the robot to start the next segment. In this sequence, the robot may drive itself upward and orient itself. Put differently, the robot may be self-locomoting and may actuate its own motion.

In some cases, fabrication of a tube includes the following steps: (1) The robot is placed in a re-usable base and tethered to a resin reservoir, electrical power, and spool of fiber (e.g., fiberglass thread). (2) The silicone membrane is inflated to fix the robot in place and to act as a mandrel, and ultraviolet LEDs are turned on to cure the resin. (3) The robot winds a segment, then drives up the newly wound segment and tilts. (4) The robot inflates once more to restart the process.

In some cases: (a) the mandrel acts as an anchor to the previous, stationary segment, and itself remains stationary during winding; and (b) the wind arm produces both the rotational and translational motions. To control the rotational speeds, a rotational motor may be employed. To control the translational speeds, a linear motor may be employed. The linear and rotational motors may be stepper motors.

In FIG. 3A, mandrel 117 is deflated. In FIG. 3B, mandrel 117 is inflated.

Figure 4D:
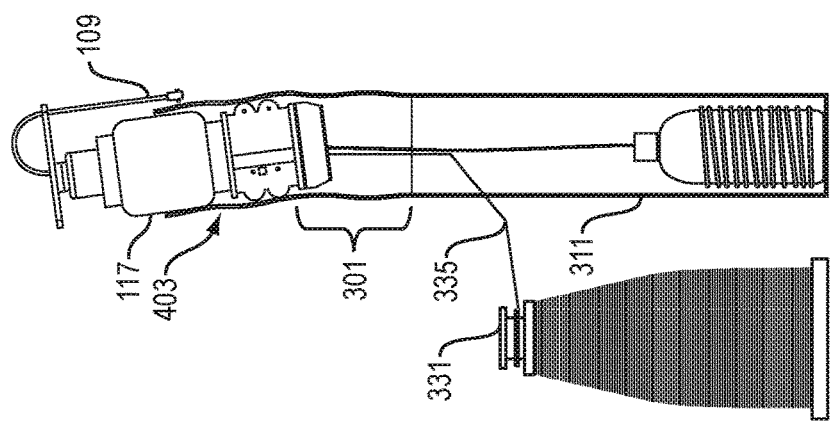
Figure 4C:
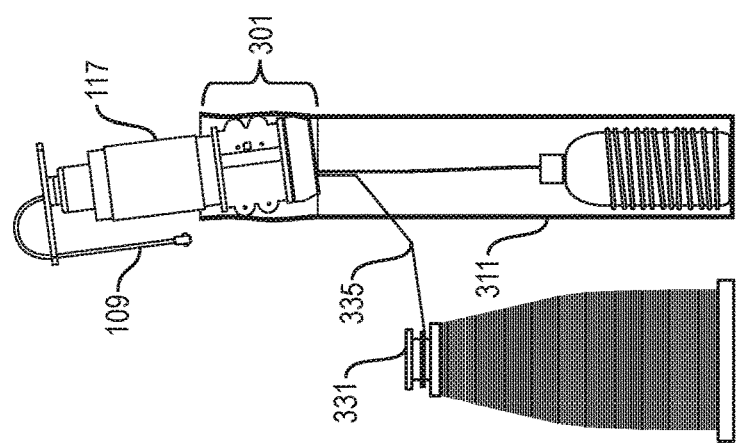
Figure 4B:
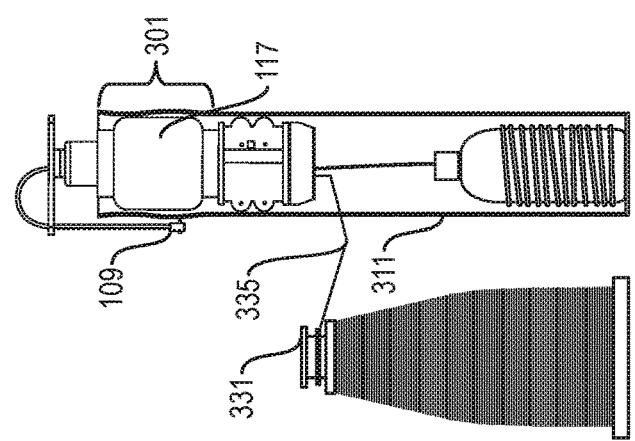
Figure 4A:
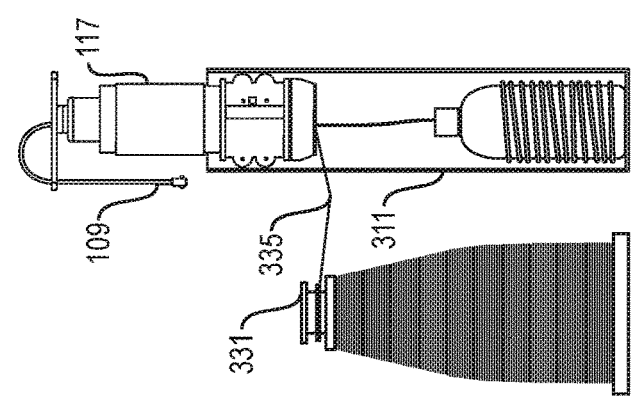

FIG. 4A shows an initial stage of fabrication of a tube. In FIG. 4A, the robot has been placed in a base 311 and tethered to a resin reservoir, electrical power, and spool of fiber. In FIG. 4A, the mandrel 117 is deflated.

In FIG. 4B, mandrel 117 has been inflated and the UV LEDs turned on, while the robot fabricates a first segment 301 of the tube by winding resin-coated thread around the mandrel.

In FIG. 4C, the first segment 301 of the tube has been cured, and mandrel 117 has been deflated. Deflating the mandrel allows the robot to detach from the first segment 301 of the tube, to move itself upward, and to tilt itself relative to the first segment 301. The robot's tilt will cause the next segment to be tilted relative to the first segment, thereby causing the overall shape of the tube to approximate a curve.

In FIG. 4D, the mandrel 117 has been inflated again while the robot fabricates a second segment 403 of the tube, by winding resin-coated threat around the mandrel. While the robot fabricates the second segment of the tube, the mandrel overlaps the first segment 401 of the tube (i.e., a portion of mandrel 117 is inside the first segment 401).

For ease of illustration, in FIGS. 3A, 4B, 4C and 4D, the tube tilts after a relatively long tube segment 301. In practice, however, the tube segments may be quite short (e.g., 100 mm or less), thereby facilitating fabrication of a tube whose overall shape more closely resembles a continuous curve. In practice, adjacent tube segments (e.g., 301 and 403) may overlap each other more than is shown in FIG. 4D.

Material Handling and Deposition

In some cases, throughout the fabrication process, a reservoir of UV-curable resin, a spool of fiber, and a pump are kept on the ground level. Storing the raw materials and pump on the ground reduces the weight that the structure must support during fabrication.

In some cases, during the winding phase, the raw materials travel up through the fabricated tube, through the center of the robot, out the top, and down the robot arm towards the nozzle. The fiber may be pulled by the robot arm, whereas the resin may be pushed up to the robot via the pump through a thin hose. The fiber may be saturated, or wetted, with resin in the nozzle immediately before it is deposited on the mandrel. The materials (fiber and resin) may be kept separate (prior to reaching the nozzle) to reduce potential for clogging and fiber breakage.

Figure 5A:
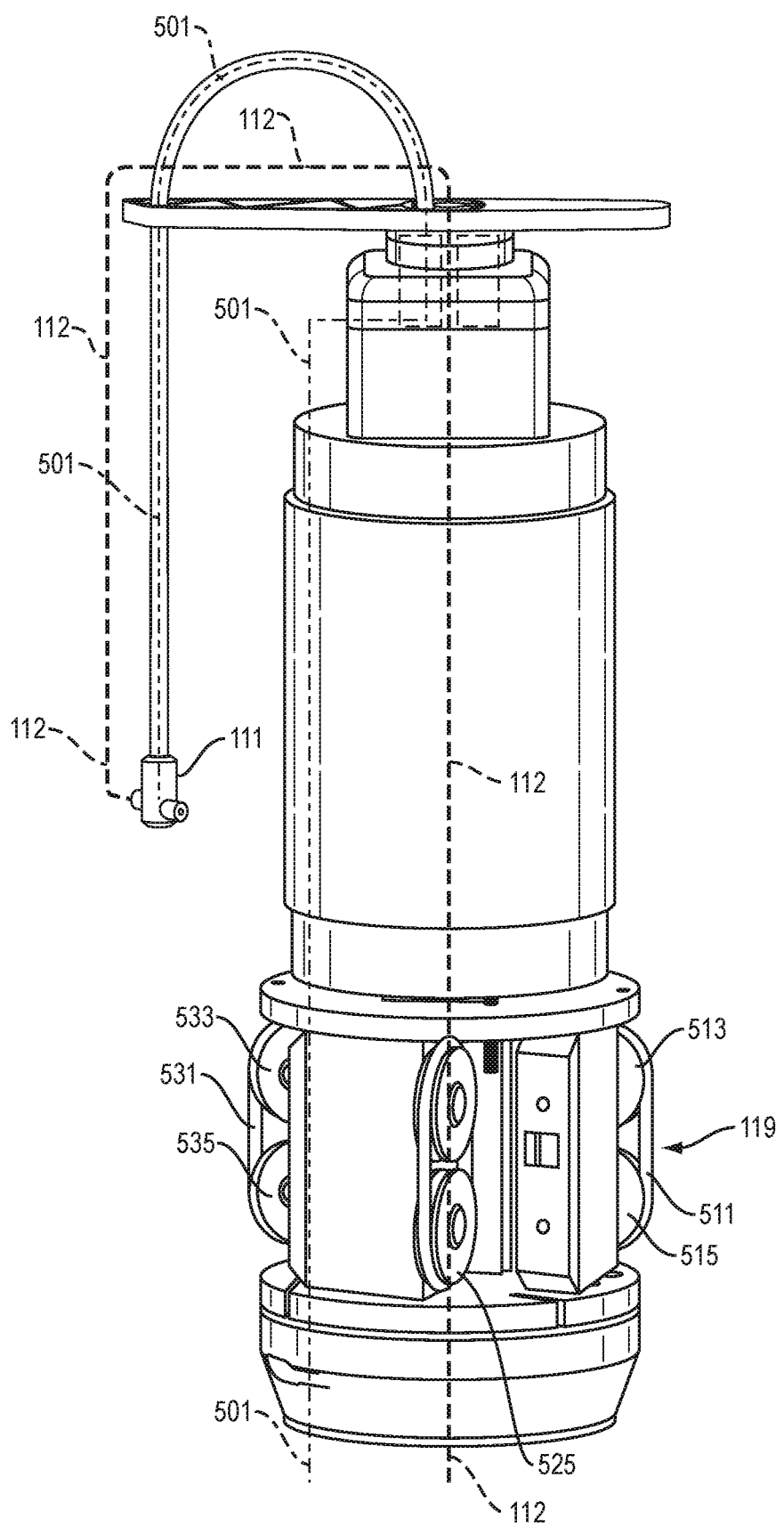
FIGS. 5A and 5B shows delivery of fiber and resin to a nozzle.
Figure 5B:
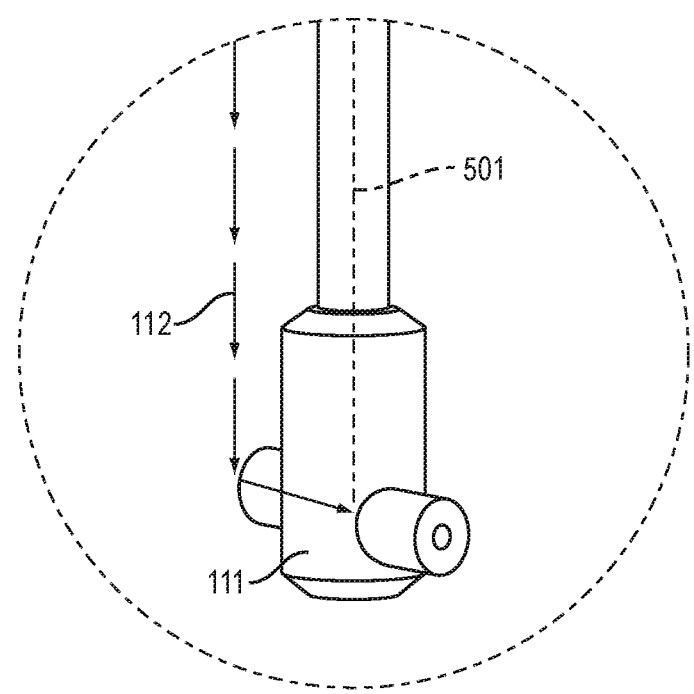

In FIGS. 5A and 5B, fiber 112 and resin 501 are delivered to nozzle 111. For instance, the fiber may comprise fiberglass thread.

Also, in FIG. 5A, motion actuators 119 comprise motor-driven bands (e.g., 511, 531). The bands may each comprise a ribbon, tread, or track and may be driven by wheels or rollers (e.g., 513, 515, 525, 533, 535). The wheels or rollers may, in turn, be driven by electric motors.

Figure 5C:
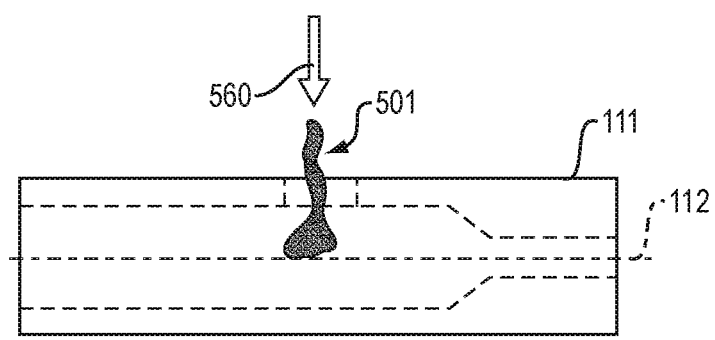
FIG. 5C shows resin being applied to fiber inside a nozzle.

FIG. 5C shows resin being applied to fiber inside a nozzle. In FIG. 5C, resin 501 enters nozzle 111 from above, via tube 109. Fiber 112 enters nozzle 111 (entering on the left side of FIG. 5C), is coated by the resin, and then exits nozzle 111 (exiting on the right side of FIG. 5C). The direction of motion of the resin, as it enters the nozzle, is symbolized by arrow 560.

Figure 6:
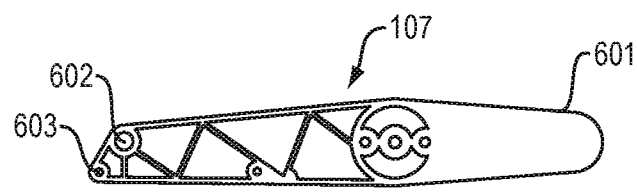
FIG. 6 shows a wind arm.

FIG. 6 shows a wind arm 107 that rotates while fiber is being wound around the mandrel. In FIG. 6, wind arm 107 includes a heavy mass 601 that is offset from the centerline of the robot. This offset helps to counterbalance the mass of tube 109 and nozzle 111.

In FIG. 6, tube 109 passes through hole 602 (of the wind arm) and fiber 111 passes through hole 603 (of the wind arm). Heavy mass 601 and hole 602 (through which tube 109 passes) are near opposite ends of wind arm 107.

In some cases, a fluid rotary union allows the resin to move from a stationary portion of the robot to the rotating wind arm. The fluid rotary union may be coupled with a slip ring, and these two together provide both fluid transmission and an electrical connection between a rotary portion of the robot and a stationary portion of the robot.

Figure 7A:
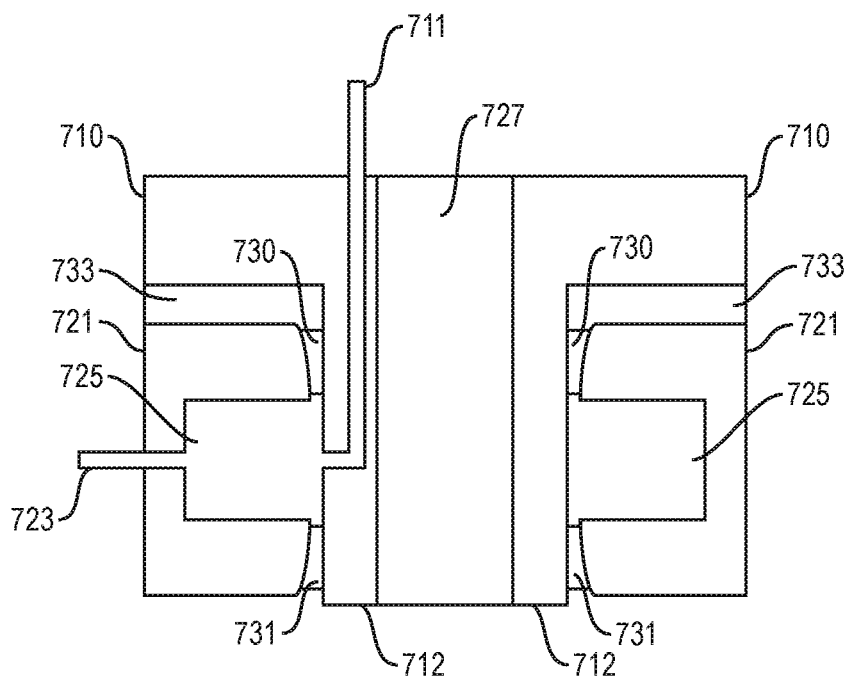
FIG. 7A shows a fluid rotary union.
Figure 7B:
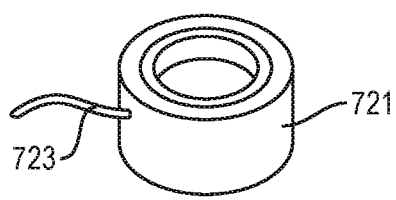
FIG. 7B shows a stationary inlet of a fluid rotary union.
Figure 7C:
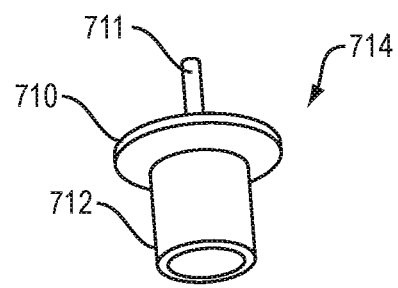
FIG. 7C shows a rotating portion of a fluid rotary union.

FIG. 7A shows a cross-sectional view of a fluid rotary union. FIG. 7B shows a stationary inlet 723 of the fluid rotary union. FIG. 7C shows a rotating portion of the fluid rotary union.

In FIGS. 7A and 7B, resin is pumped into the fluid rotary union, via stationary inlet port 723. Inside the fluid rotary union, resin fills chamber 725. Chamber 725 is enclosed on three sides (outer side, and portion of top and bottom) by stationary walls 721. Chamber 725 is enclosed on another side (inner side) by a rotating component 714. This rotating component 714 includes a solid, annular shaft 712, a flange 710, and an outlet port 711. The resin in chamber 725 is pressurized due to an external pump. The resin exits chamber 725 via the rotating outlet port 711. Shaft 712 may surround a hollow central region 727 of the fluid rotary union. One or more seals or bearings (e.g., 730, 731, 733) may help enclose the resin and prevent it from leaking.

In some cases, the mandrel is configured to act as a temporary joint between a previous segment of the tube and a new segment of the tube, while the new segment is being fabricated by the robot. Also, the mandrel's ability to inflate and deflate (and thereby vary its diameter) enables the mandrel to shift location along the length of a tube (which may be curved).

In some cases, the mandrel comprises a soft, inflatable membrane made of sheets of translucent silicone. The silicone may be layered to ensure it inflates into a cylindrical form, rather than spherically. An on-board pneumatic pump and bidirectional solenoid valves may enable the mandrel to inflate and deflate. The inner radius of the resulting composite segment may be varied by changing duration of inflation. In some cases, the mandrel begins to deflate while fiber is still being wound around the mandrel. Thus, in some cases, deflation does not substantially increase the duration of the overall fabrication process.

The flexibility of the mandrel is beneficial because when the robot tilts within the tube to create curvature (of the tube), one side of the robot may be closer to a wall of the tube than is the other side of the robot. In some cases, an inflatable mandrel expands to fill a gap (between a side of the robot and the wall of the tube) that occurs when the robot is tilted. By filling this gap, the mandrel may make a smooth joint between segments. Additionally, both the mandrel and the fiberglass composite may be translucent. UV-LEDs on the inside of the mandrel may assist in curing the composite from the inside (with the UV light shining through the mandrel).

In some cases, once the wind process is complete for a single section and the resin is cured, the membrane then fully deflates. Deflation may delaminate the robot from the structure, and free the robot so that the robot can drive along the tube.

In some cases, the winding arm 107, tube 109 and nozzle 111 rotate relative to the robot body, along the cylinder's central axis (or along an axis parallel to cylinder's central axis). There may be two material feeds (one for fiber and one for resin) and at least one of the material feeds may be off-center from the axis of rotation, to prevent the two feeds from tangling. The fluid rotary union may provide a fluidic connection between the rotating and non-rotating parts of the robot. The fluid rotary union may include seals and bearings that together maintain a consistent seal and prevent resin from leaking into the robot body. A slip ring (or other structure) may provide electrical power (and communication) connections between the rotating and non-rotating parts of the robot.

In some cases, as the wind arm and nozzle rotate around the body of the robot, they generate centrifugal forces on the robot (and on the tube which supports the robot). These forces may be counterbalanced by extending the length of the wind arm opposite the nozzle (e.g., by adding mass 601), and thus creating a counterbalancing centrifugal force as the wind arm rotates.

The inflatable mandrel may provide an even surface for laying fiber in the shape of an even-walled tube. After the composite cures and the inflatable contracts, the composite may delaminate from its surface allowing the robot to drive along the tube freely again. In some cases, the mandrel comprises a silicone material that is sufficiently elastic to deflate and to inflate. A secondary silicon sleeve may surround the main silicone layer of the mandrel (e.g. in the middle section of the inflatable mandrel). The secondary silicon sleeve may be stiffer and less elastic than the main silicone layer, and may thereby constrain the inflatable mandrel to have a right circular cylindrical shape when inflated. The stiffer secondary silicon sleeve may cause the inflated mandrel to be stiff in the winding region (i.e., the region around which fiber is being wound).

In some cases, the diameter of the tube within local sections of the tube is controlled by (a) locally binding parts of the inflatable mandrel with fiber while the mandrel is partially inflated and (b) then fully inflating For instance, the fiber may be wound around the mandrel before the mandrel is inflated or when the mandrel is partially inflated, in order to prevent the mandrel from fulling inflating. For example, in some cases, the robot winds fiber around the bottom half of the mandrel before the mandrel is inflated, and then, as air pressure inside the mandrel increases, the top un-bound half of the mandrel inflates and the top bound part of the mandrel inflates. The bound section of the mandrel may be constrained by the fibers, which do not significantly expand. In some cases, the binding and inflating may be done in partial steps, thereby achieving multiple different diameters of an inflated mandrel and controlling the shape of the inflated mandrel. In some cases, by adjusting the inflation and localizing the bound areas, varying diameters are achieved. For instance, in some cases, part of the inflatable mandrel is bound by fiber, then the mandrel is inflated to 25% of peak air pressure, then another part of the mandrel is bound by fiber, then the mandrel is inflated to 50% of peak air pressure, and so on.

Figure 8:
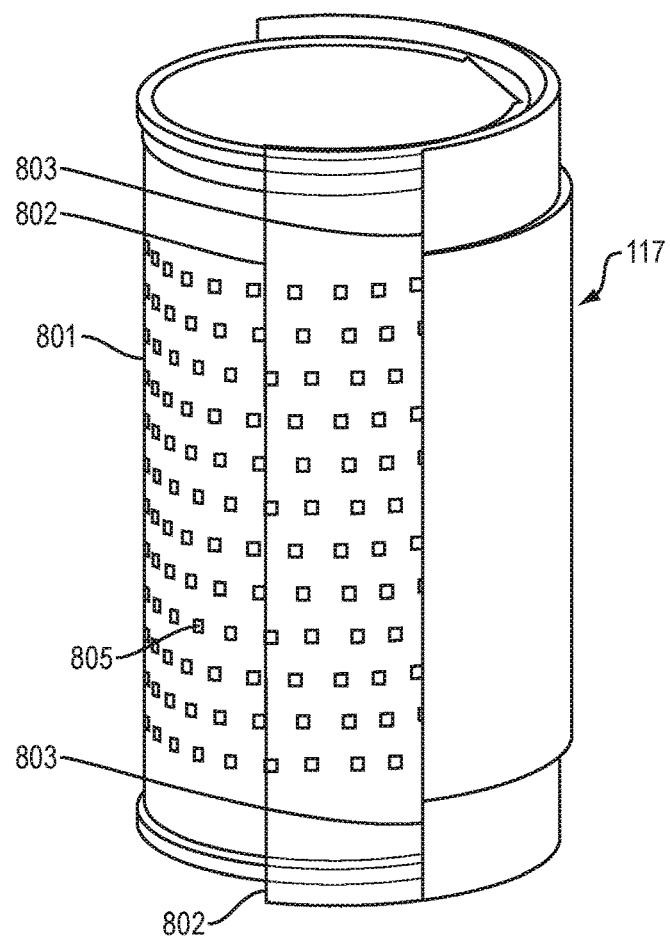
FIG. 8 shows an inflatable mandrel.

FIG. 8 shows a mandrel. The mandrel 117 is inflatable and deflatable. In FIG. 8, the mandrel includes an inner silicon layer 802 that elastically stretches and contracts, depending on the amount of air pressure (of pressurized air inside the robot) pressing against the inner silicon layer. The mandrel also includes an outer silicon layer 803 that is external to the inner layer and that constrains the expansion of the inner layer. Outer layer 803 may be stiffer than inner layer 802. The mandrel may include an array of UV-LEDs (e.g., LED 805) that is supported by a cylindrical support structure 801. Silicone layers 802, 803 may be translucent or transparent to UV light. Thus, UV light from the LEDs may pass through silicone layers 802, 803 and cure deposited resin-coated fiber that is wound around the mandrel.

Figure 9:
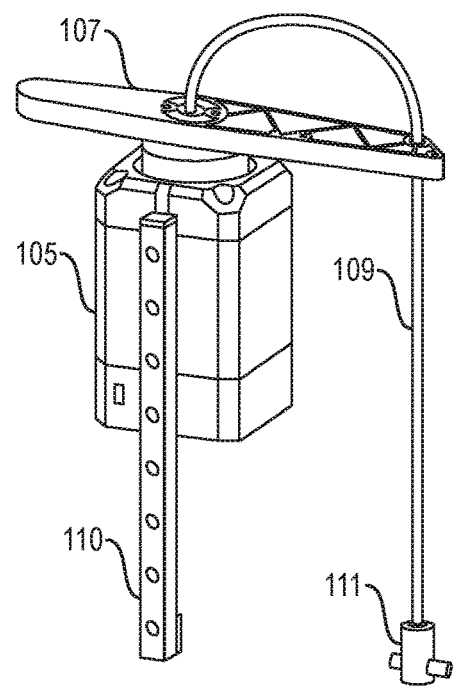
FIG. 9 shows a mechanism for actuating translational and rotational movement.

FIG. 9 shows a mechanism for actuating translational and rotational movement. In FIG. 9, motor 105 causes a shaft to rotate, which in turn causes wind arm 107 (and thus tube 109 and nozzle 111) to rotate. These rotations may be relative to an axis that is co-located with, or parallel to, a longitudinal axis of the robot. In some cases: (a) the position of linear rail 110 is fixed relative to motor 105; (b) another motor (e.g., 1101 in FIG. 11) causes linear rail 110 to move (i.e., translate) up and down; and (b) this in turn causes motor 105, wind arm 107, tube 112 and nozzle 111 to move (i.e., translate) up and down. In some other cases: (a) linear rail 110 is in a fixed position relative to the main body of the robot; (b) electric motor 105 and linear rail 110 are not in fixed positions relative to each other; and (c) electric motor 105 actuates its own linear motion up and down linear rail 110.

Mobility

In some cases, a drive sub-assembly provides fine control over distances travelled by the robot and orientation of the robot, and also adapts to varying radii within a tube. This, in turn, may facilitate extending the length of the fabricated tube and producing curvature of the tube.

In some cases, the drive sub-assembly includes four treads that are arranged in a cross configuration around the cylindrical body of the robot. When all four tracks rotate in the same direction, the robot may move forward or backward along the central axis of the tube. When opposing tracks are rotated in opposite directions, the robot may tilt. For instance, in some cases, the drive system may tilt up to 2.5 degrees relative to the central axis of the previous tube segment.

In some cases, the drive system is equipped with internal sensors, such as a 6 degree-of-freedom IMU and four sets of magnetic encoders. One magnetic encoder may be attached to each track. The IMU may monitor the orientation of the robot, reported as a quaternion using fused sensor data, to provide feedback during orient phases of operation, so that desired curvatures may be produced. The robot may keep track of the total length of the tube (across segments of the tube) by summing distances traveled, as measured by the encoders. The length of each segment may be controlled by the linear actuator of the wind arm. In some cases, the encoders afford resolutions of 0.02 mm.

In some cases, the robot crawls along its tube regardless of the tube orientation, including horizontal and inverted tubes. A spring-loaded transmission system may press the treads against the inner wall of the tube, to achieve traction and to prevent the robot from falling down the inside the tube. The spring-loaded transmission may adjust the width (diameter) of the robot. For instance, in some cases: (a) when opposing pairs of tracks are fully extended, away from the body of the robot, the width of the robot reaches 119 mm; and (b) when opposing pairs of tracks are fully retracted, the width of the robot is 97 mm.

In some cases, once a 90 mm segment of tube has been wound, the robot may drive up 60 mm. This may provide a 30 mm overlap with the old segment and the next segment. After the robot moves up, it may tilt along a pitch and roll, each corresponding to one pair of tracks, before inflating the mandrel and beginning the wind for the next segment.

In some cases, the robot includes stepper motors or linear actuators that provide accurate and simple feed-forward simultaneous velocity and acceleration control. The robot may also include limit switches (e.g., 103) that zero vertical height and angular direction between each segment.

Figure 10:
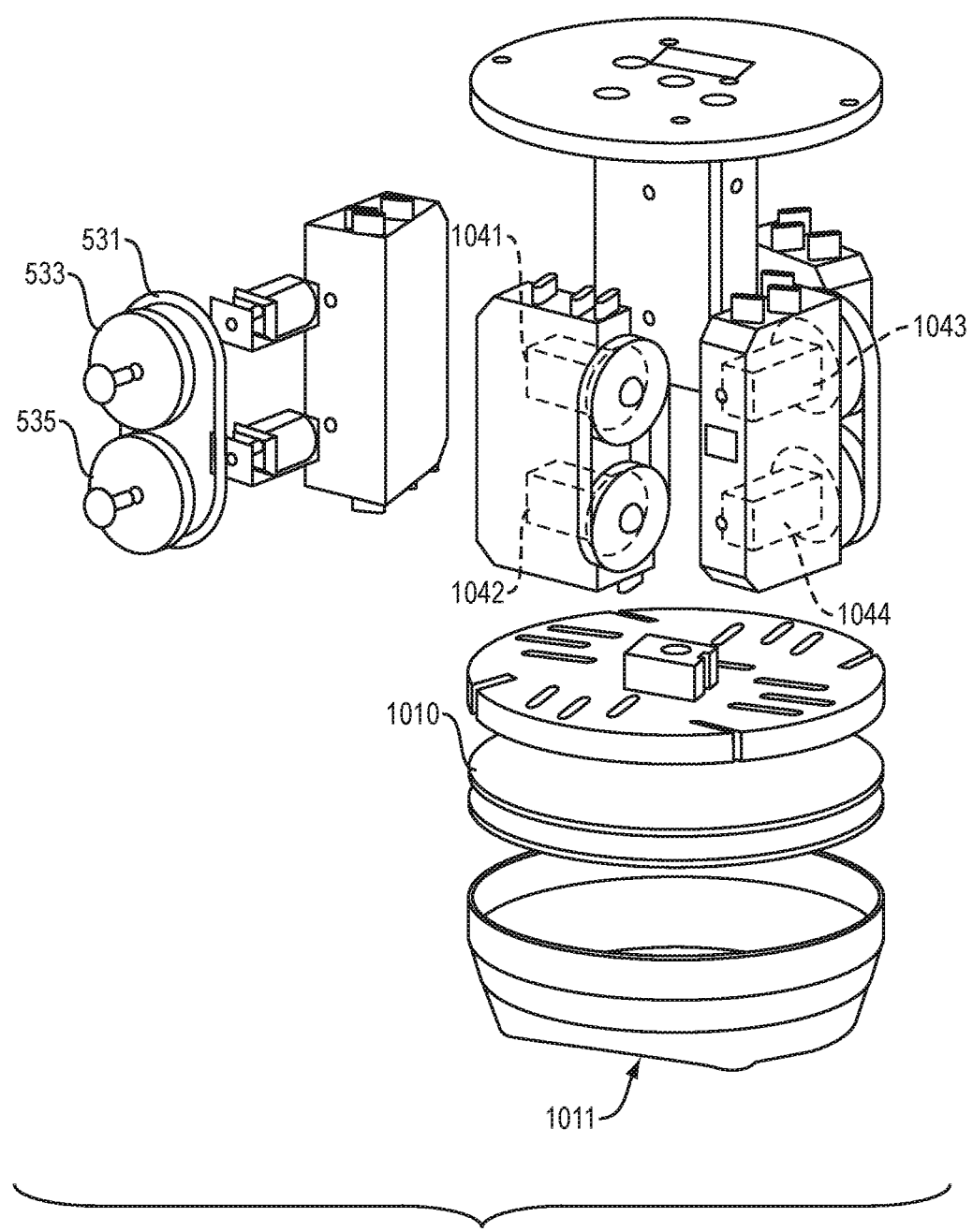
FIG. 10 shows an exploded view of a portion of a robot.

FIG. 10 shows an exploded view of a portion of a robot. In FIG. 10, bands (e.g., 531) are guided and actuated by wheels (e.g. 533, 535). Each band may comprise a ribbon, tread, or track. The wheels in turn may be actuated by DC electric motors (e.g., 1041, 1042, 1043, 1044). The robot may include a control board 1010 (or microcontroller) that controls motors, pumps and LEDs in the robot and controls one or more pumps in the tubular base. A bottom section 1011 may be tethered to: (a) a hose that delivers resin to the robot and (b) wiring that delivers electrical power to the robot or that provides an electrical communication link.

Figure 11:
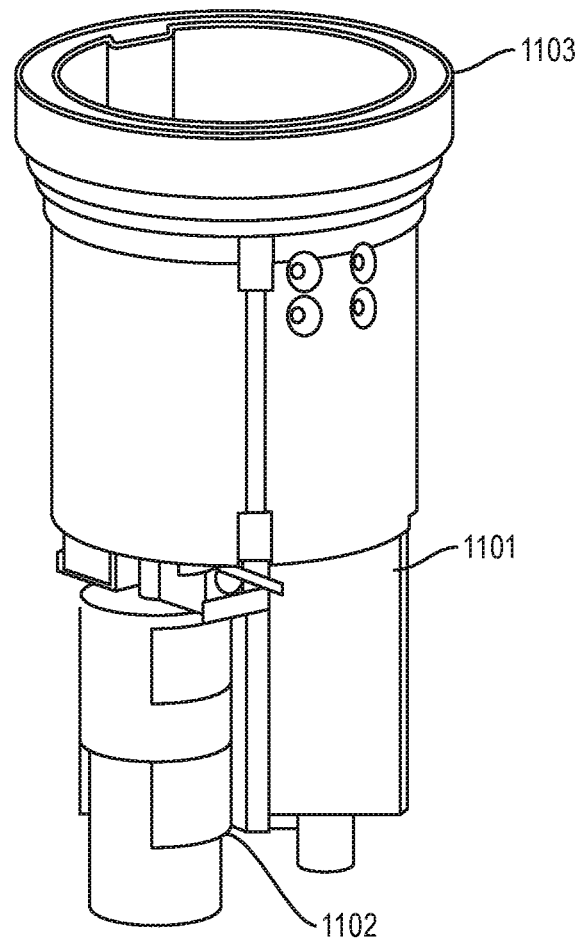
FIG. 11 shows a linear motor and an air pump.

FIG. 11 shows other internal hardware in the robot, including a linear motor 1101, air pump 1102 and limit switch 1103.

In FIG. 11, motor 1101 may actuate linear motion of linear rail 110 (show in FIG. 9), which in turn actuates linear motion of motor 105, wind arm 107, tube 109, and nozzle 111 (also shown in FIG. 9). These linear motions may comprise translation in a direction parallel to the central axis of the robot (e.g., translation vertically up or down, if the central axis of the robot is then vertical). Thus, these linear motions may cause nozzle 111 to move to different positions along the length of mandrel 117 while depositing fiber, and thus to wind and deposit fiber around mandrel 117 at different positions along the length of the mandrel. For instance, these linear motions may—if the central axis of the robot is vertical—cause nozzle 111 to move up and down to different vertical positions relative to mandrel 117 while winding fiber around the mandrel.

In FIG. 11, air pump 1102 and a solenoid pump may control the pressure of pressurized air in the mandrel, and thereby control inflation and deflation of the mandrel.

Coordination Among Multiple Robots

In some implementations, a control system facilitates parallel (in time) fabrication. The control system may control multiple robots that are simultaneously fabricating multiple tubes, one tube per robot.

In some cases, the control system prevents robots from colliding with their own tubes, and from colliding with external obstacles, including other robots, tubes, or the environment. As used herein, a "self-collision" means a collision between a robot and a tube that the robot is fabricating.

In some cases, a portion of a robot (including the robot's wind arm) protrude from each tube. The length and travel distance of the wind arm determine a collision volume (e.g., a collision cylinder) around the operational robot that affects how close tubes may be fabricated to one another. The shorter the arm, or the closer it is to the rotating axis, the closer the tubes may be to each other. However, if the arm is too short, the robot may self-collide while performing steep drive turns, reducing the amount that the robot can tilt between each segment.

In some cases, there are three regions of the robot body where self-collisions can occur. These three regions may limit the maximum curvature of a tube that the robot fabricates. For instance, in a prototype, the robot is able to tilt up to 3° with 100 mm tube segments, but tilts do not exceed 2.5° to maintain a safety factor. The minimum curvature and the minimum distance between tubes may be decreased by altering the robot's body to reduce the self-collision points, or by allowing an arm-stowing or flexible mechanism.

Figure 12A:
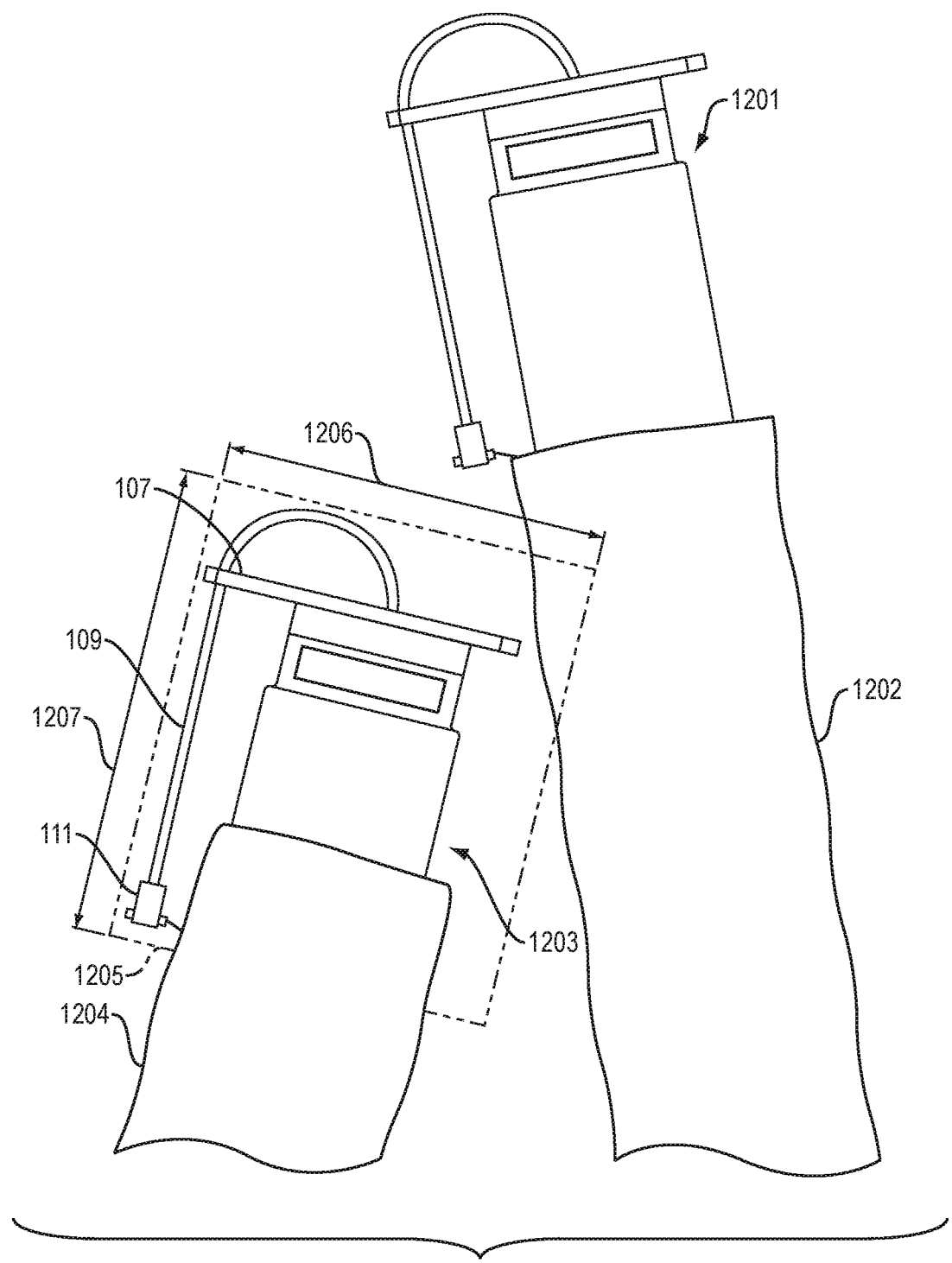
FIG. 12A shows a collision cylinder.

FIG. 12A shows a collision cylinder. In FIG. 12A, a first robot 1203 fabricates a first tube 1204 while a second robot 1201 fabricates a second tube 1202. If an external object were to enter collision cylinder 1205 while wind arm 107 was rotating about the central axis of robot 1203, then the external object might collide with tube 109, nozzle 111 or wind arm 107. For instance, in FIG. 12A, if wind arm 107 continued to rotate about the central axis of robot 1203, then wind arm 107, tube 109 or nozzle 111 would collide with tube 1202. The collision cylinder may have a diameter 1206 and a length 1207.

In some cases, the robots may be controlled in such a way that the collision volume (e.g., collision cylinder) for a first robot (which is fabricating a first tube) does not intersect any other tube or any other robot. In other words, the robots may be controlled in such a way that each specific robot does not collide with any other robot and does not collide with any tube that is being fabricated by another robot.

Figure 12B:
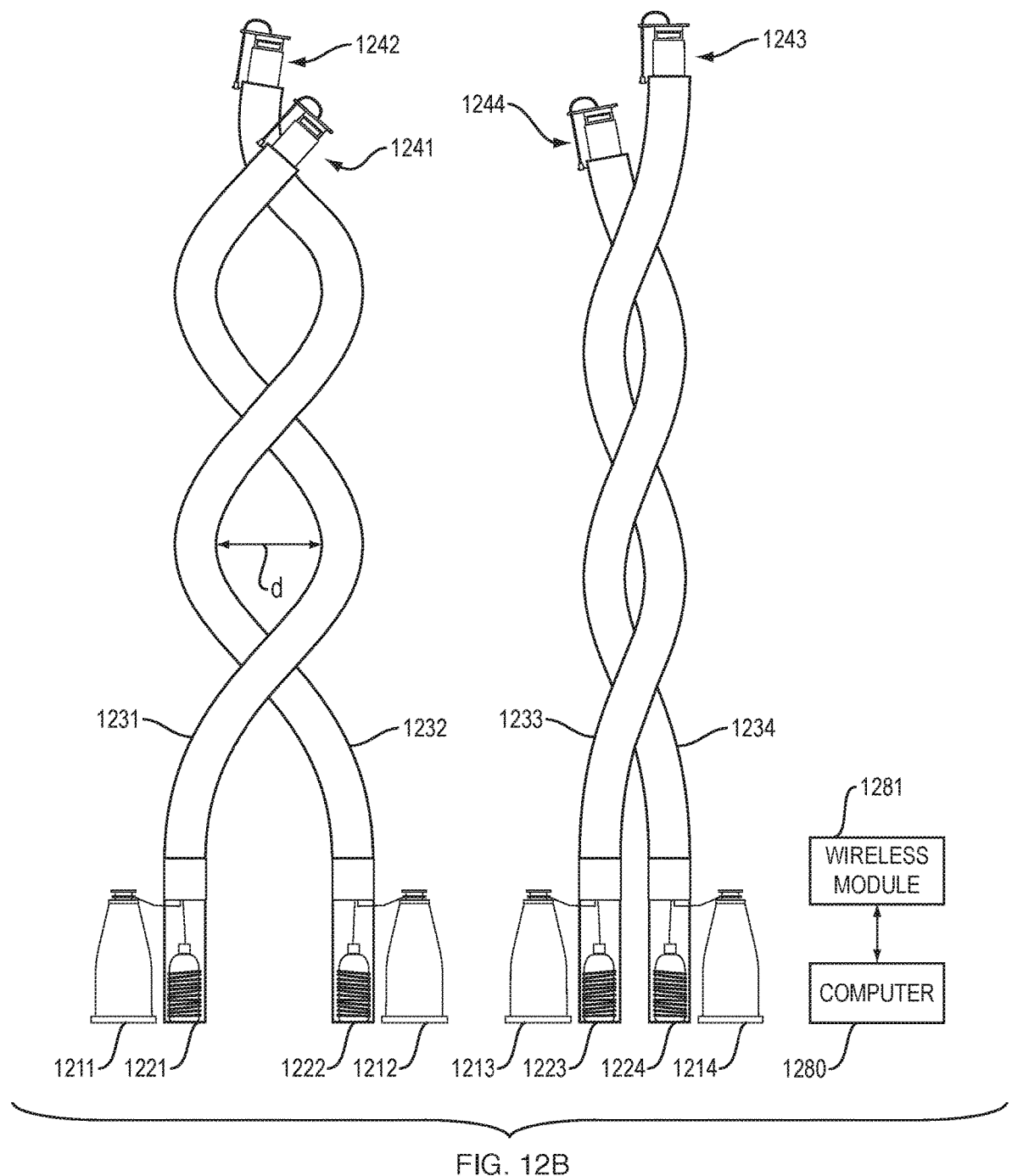
FIG. 12B shows a team of robots simultaneously fabricating multiple tubes, one robot per tube.

FIG. 12B shows a team of robots 1241, 1242, 1243, 1244 simultaneously fabricating multiple tubes 1231, 1232, 1233, 1234, one robot per tube. In FIG. 12B, the minimum distance between any pair of tubes is at least as great as distance d. In FIG. 12B: (a) fiber spool 1211 and resin reservoir 1221 provide raw materials for robot 1241; (a) fiber spool 1212 and resin reservoir 1222 provide raw materials for robot 1242; (a) fiber spool 1213 and resin reservoir 1223 provide raw materials for robot 1243; and (a) fiber spool 1214 and resin reservoir 1224 provide raw materials for robot 1244. A computer 1280 may communicate with robots 1241, 1242, 1243, 1244 via wireless module 1281.

Figure 12C:
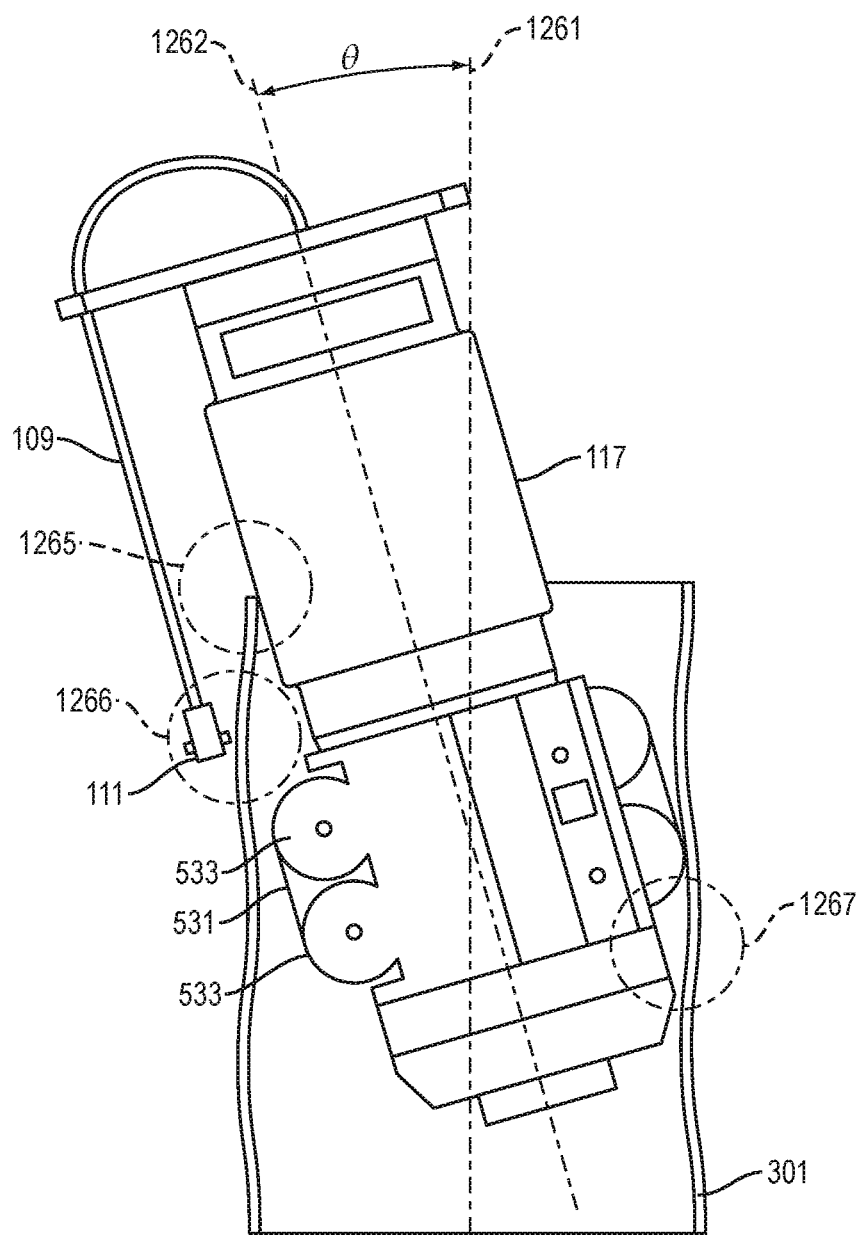
FIG. 12C shows physical constraints on the angle of tilt of a robot.

FIG. 12C shows an example of physical constraints on the angle of tilt of a robot. In FIG. 12C, the central axis 1262 of the robot (and of mandrel 117) is tilted at angle θ relative to the central axis 1261 of tube 301. In FIG. 12C, the tube constrains the extent to which the robot may tilt, because if the tilt were to exceed angle θ, then: (a) mandrel 117 would collide with tube 301 in region 1265; (b) nozzle 111 would collide with tube 301 in region 1266; or (c) the base of the robot would collide with tube 301 in region 1267.

Figure 12D:
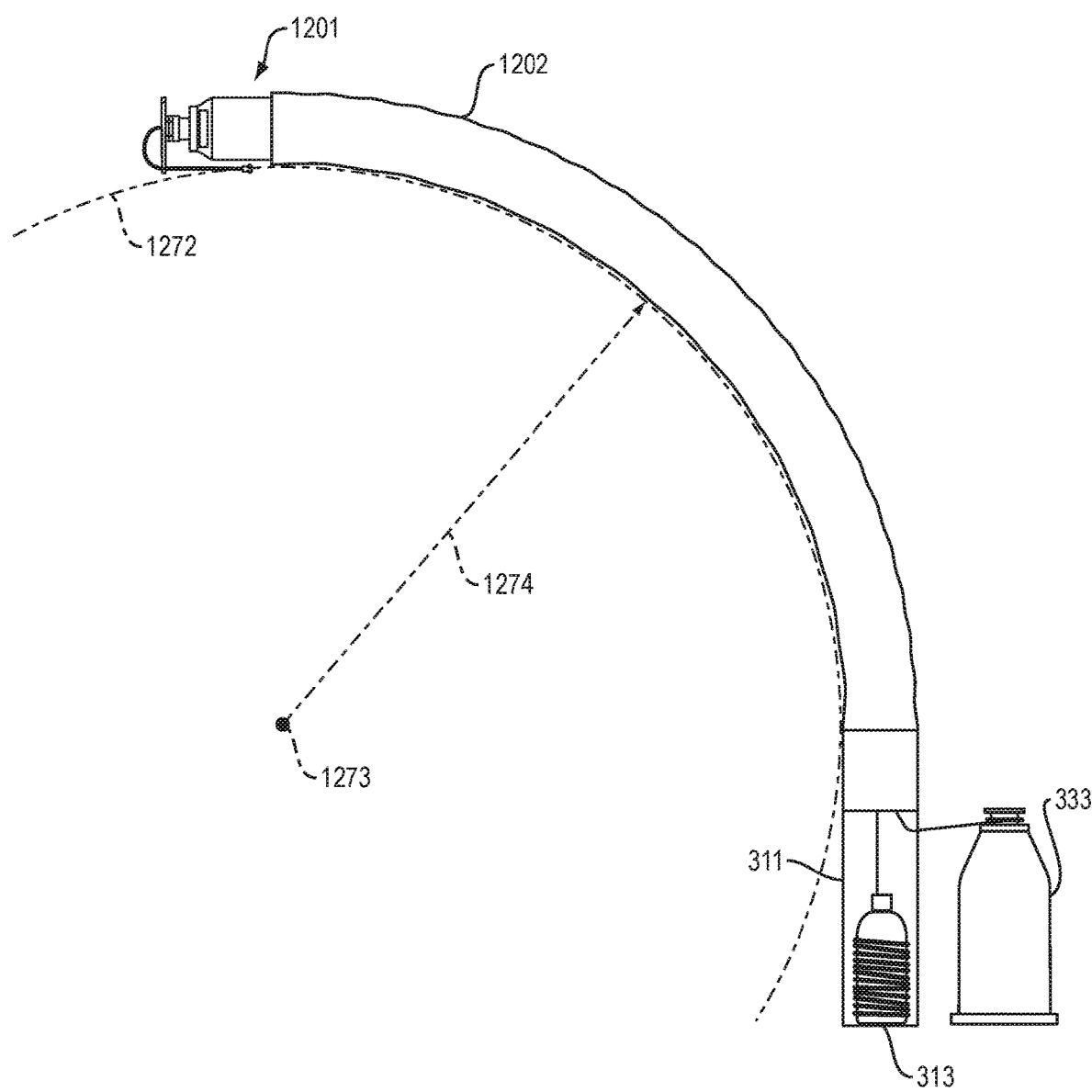
FIG. 12D shows a radius of curvature of a curved tube.

FIG. 12D shows a radius of curvature of a curved tube, in an illustrative implementation of this invention. In the example shown in FIG. 12D, a robot 1201 is fabricating a tube 1202, in such a way that, after completing each segment of the tube, the robot tilts relative to the most recent segment. This in turn causes tube 1202 to have a central axis that is curved or that approximates a curve. The curvature has a radius 1274 and a center 1273.

As noted above, self-collisions may limit the maximum angle at which a robot may tilt. This in turn may limit the minimum curve radius (e.g., may limit how small is radius 1274 in FIG. 12D). For instance, in a prototype of this invention, the robot safely achieved tilting angles of 2.5 degrees for segment lengths of at least 80 mm. In some cases, a controller may assume that the collision cylinder is larger along both axes in order to account for localization inaccuracies during the fabrication process.

In some cases, each specific robot may include an onboard computer (e.g., microcontroller) that employs a local coordinate system relative to a tube while controlling the specific robot's fabrication of the tube. A master computer, in turn, may employ a global coordinate system when controlling the multiple robots. For instance, a master computer (e.g., 1280) may employ a global coordinate system: (a) to prevent collisions between robots; (b) to prevent collisions between a robot and tubes that other robots are fabricating; or (c) to control direction of fabrication of a tube (e.g., in such a way as to cause multiple tubes to form an intertwined or interwoven pattern.)

In some cases: (a) the robots are calibrated by facing the robots in the same direction to establish a joint (global) reference frame; and (b) mobility commands (e.g., to tilt relative to a tube) are then specified in the shared reference frame and transformed into local coordinate frames onboard each robot.

In some cases, a central computer tracks the progress of each robot and sends the appropriate commands one instruction at a time. All robots and the central computer may communicate over user datagram protocol (UDP) on a shared wireless network. To detect failures, as well as additional robots, each robot may produce a 1 Hz wireless "heartbeat" on the network that is monitored by the central controller. Each heartbeat may contain information about the unique ID of the robot, the status, and the last command received. This information may allow the central controller to verify packet loss and to send the appropriate next instruction.

In some cases, the position of each robot, relative to the global coordinate system, is tracked during tube fabrication. For instance, a 3-axis IMU, 3-axis gyroscope, or 3-axis accelerometer may be employed to track the position of each robot during tube fabrication.

Figure 13:
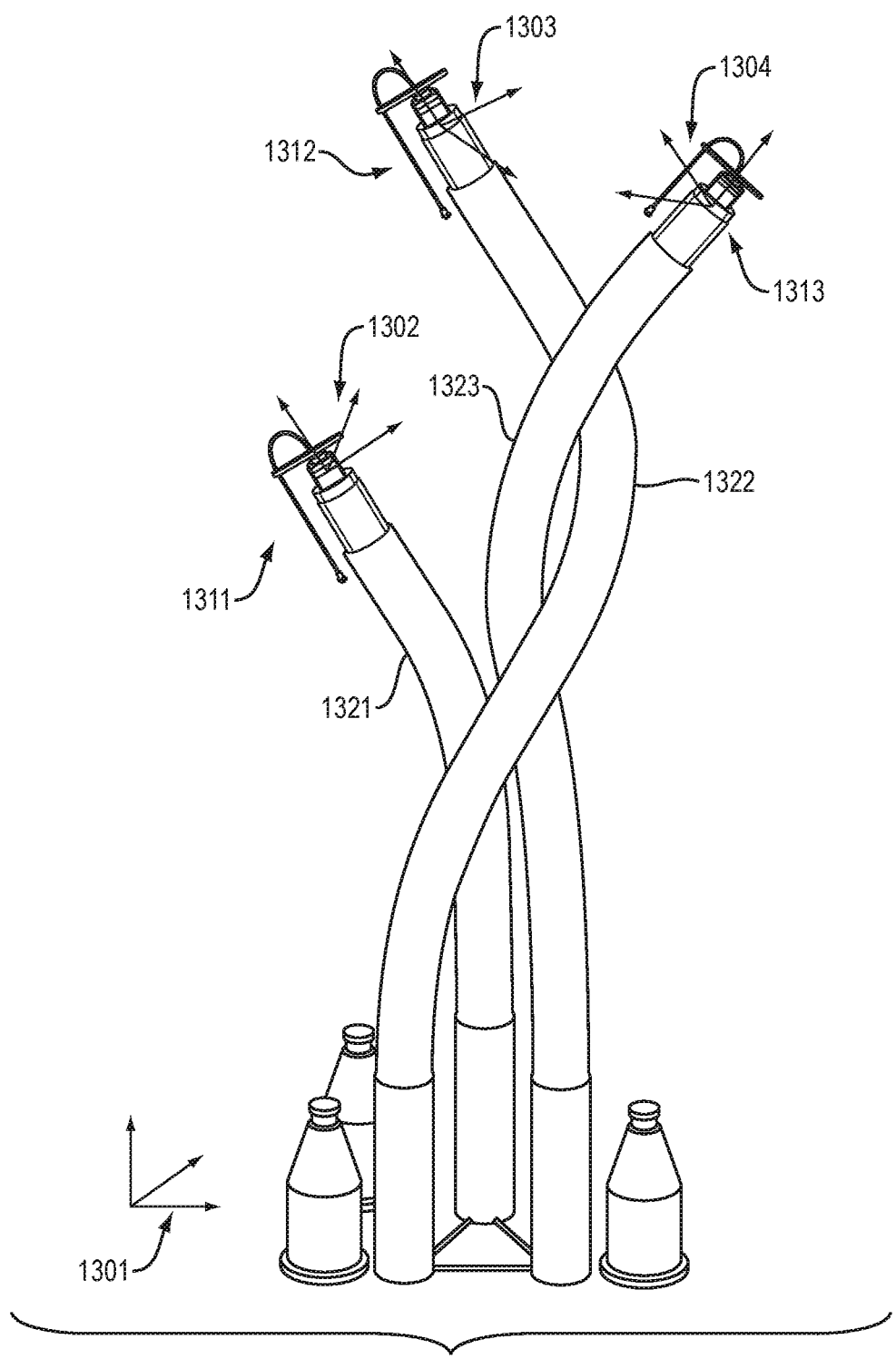
FIG. 13 shows local coordinate systems and a global coordinate system.

FIG. 13 shows an example of local coordinate systems and a global coordinate system. In FIG. 13, three robots are fabricating three tubes simultaneously, one robot per tube, while each employs its own local coordinate system. Specifically, robots 1311, 1312, 1313 are employing local coordinate systems 1302, 1303, 1304, respectively, while fabricating tubes 1321, 1322, 1323, respectively. At the same time, a master computer employs a global coordinate system 1301 to control the overall fabrication pattern (e.g., to prevent collisions between robots or between a robot and a tube being fabricated by another robot).

Figure 14:
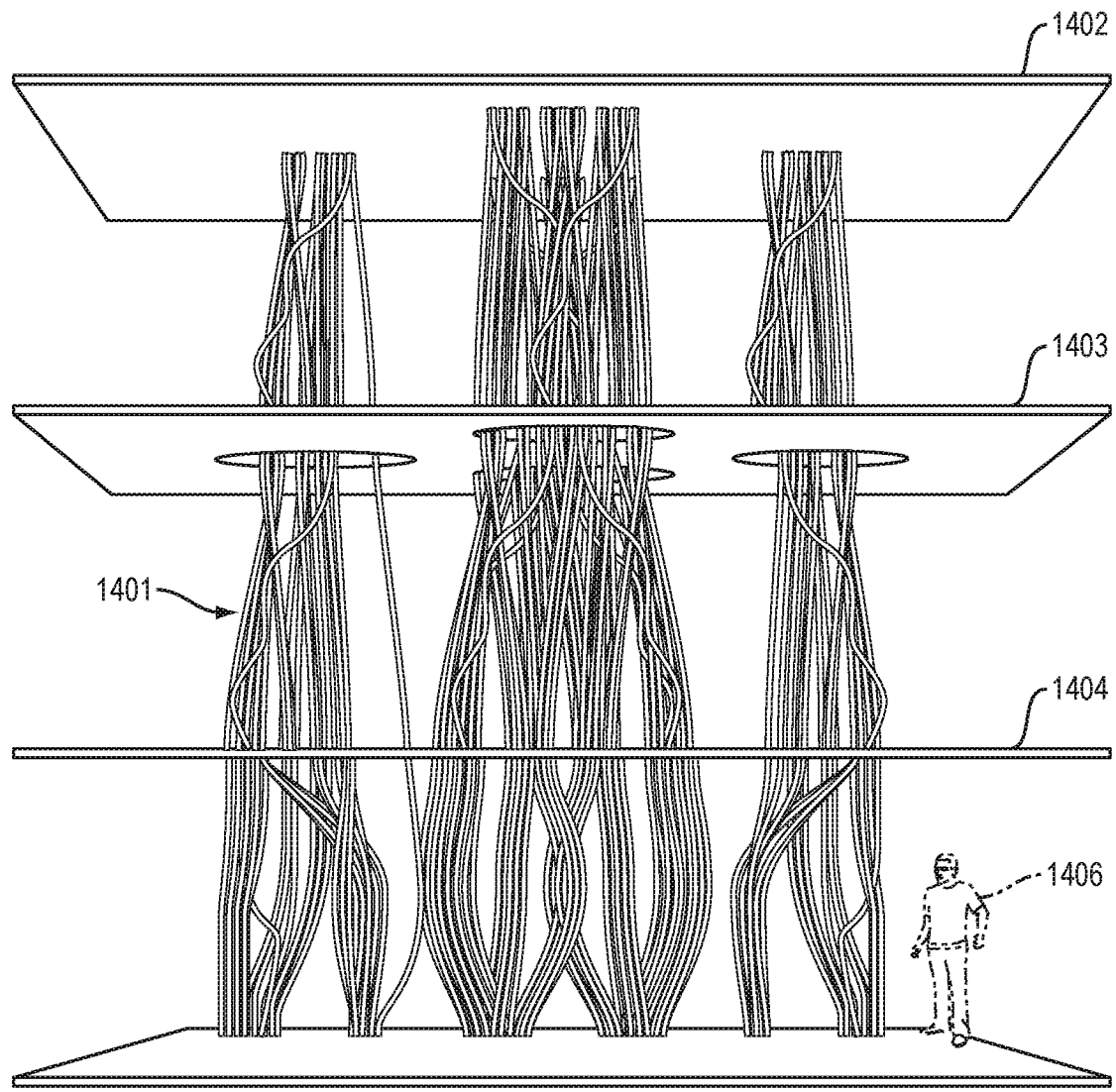
FIG. 14 shows an example of a structure that is supported by multiple tubes.

In some cases, a team of robots builds a tubular structure that supports not only its own weight but also the weight of other objects. FIG. 14 shows a structure that is supported by multiple, intertwined tubes 1401. In FIG. 14, each of the tubes has been fabricated by a robot. The tubes 1401 pass through apertures in structures 1404 and 1403. In FIG. 14, the tubes 1401 support their own weight and the weight of structure 1402. The tubular structure may be large compared to a human user 1406.

In some cases, each robot is placed within a base structure to define its starting position. A few robots may start fabricating tubes. Additional robots may build other tubes in such a way that these additional robots are attracted to the existing segments of the rubes, yet avoid collision with these existing segments. This may form an intertwined or interwoven structure. A user may input instructions that determine characteristics of the structure.

Figure 15:
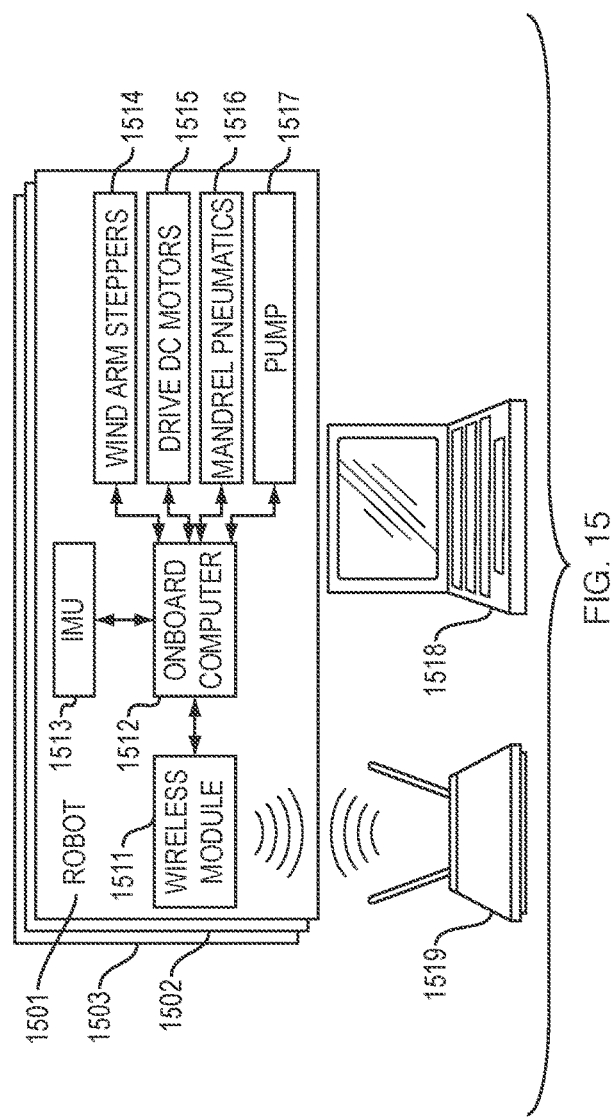
FIG. 15 is a block diagram of control hardware for controlling a multi-robot system.

FIG. 15 is a block diagram of control hardware for controlling a multi-robot system. In FIG. 15, central computer 1518 provides overall control for a team of robots while they fabricate tubes. Central computer 1518 may compute trajectories for robots 1501, 1502, 1503, segment the trajectories into sequential motion instructions for each robot to follow, and transmit the instructions to robots 1501, 1502, 1503 via a wireless transceiver 1519. Each robot may wirelessly transmit periodic updates of its status, position and orientation (e.g., 1 Hz "heartbeats"). Central computer 1518 may monitor the progress of all the robots and wirelessly send updated instructions. The wireless communications may employ a user datagram protocol (UDP). Each robot may house a wireless module 1511 (e.g., a transceiver that includes an ESP8266 Wi-Fi® microchip). Each robot may include an on-board computer 1512. For instance, the on-board computer may comprise a Teensy® 3.6 development board, including a 180 MHz ARM® processor. The onboard computer may interpret instructions (sent from central computer 1518), update the robot's state machine, and output instructions for appropriate actuator motions. For instance, the onboard computer may control linear and rotary stepper motors 1514 that actuate translation and rotation, respectively. The onboard computer may also control drive DC motors 1515 that, via bands, treads or tanks, actuate motion of the robot as a whole. (For instance, the drive motors 1515 may include motors 1041, 1042, 1043, 1044 in FIG. 10.) To determine appropriate actuator motions, the onboard computer may execute a PID (proportional-integral-derivative) control algorithm that takes, as an input, pose data from an IMU 1513 (e.g., a six degree of freedom IMU). The IMU may output fused pose information from a gyro and accelerometer, and from encoders mounted to each tread. The onboard computer may also control inflation and deflation of mandrel 117, by controlling pneumatic hardware 1516 (e.g., pneumatic valves and a DC pump). In addition, the onboard computer may control resin flow to the robot, by controlling a pump 1517. For instance: (a) pump 1517 may be a peristaltic pump; and (b) the onboard computer may control resin flow to the robot by controlling a stepper motor in the peristaltic pump.

In some cases, separate motion commands are used for winding, driving, and orientation motions. These commands may be specified with parameters, such as time span of execution, distances, or speeds. In some cases, instructions control mobility of a robot. These mobility instructions may specify parameters such as segment height of a tube segment, overlap between two tube segments, and tilt angle of each tube segment.

In some cases, a continuous-track based mobility system employs four tracks to drive along the inside of a tube. Each track may be attached to the robot body via two springs and slid along a rail. The spring-loaded tracks may function as a suspension. The spring-loaded tracks may enable the tracks to expand or contract to fit snugly in various diameter tubes. In some cases, the spring-loaded tracks are positioned in equally spaced radial positions around the robot, so that the net forces exerted by the springs against the main body of the robot cancel out. For instance, three spring-loaded tracks may be located in equally spaced radial positions around the robot. Or, for instance: (a) the spring-loaded tracks may consist of pairs of tracks; and (b) in each pair of tracks, the two members of the pair may be on opposite sides of the robot.

In some cases, each track is driven by micro metal gearmotors (e.g., DC motors) and has a magnetic encoder to control linear motion during drive commands. In some cases: (a) a first PID controller controls distance travelled along a tube; and (b) a second PID controller controls tilt.

In some cases, a robot constructs an individual tube with specified curvature and length. This fabrication may be done in parallel (e.g., with multiple robots simultaneously fabricating tubes) or sequentially, with a single robot constructing tubes, one after another. The resulting tubes may be self-supporting, and may interweave, intertwine or be positioned side-by-side. In some cases, the tubes form surfaces and volumes, such as walls or bridges. In some cases, the tubes help to support each other and to support additional weight of other objects.

In some cases, a central computer (e.g., 1518) performs a modified Reynold's flocking algorithm to guide the robots as they fabricate the tubes. This flocking algorithm may be based on Reynold's original flocking rules, including separation, cohesion, and alignment. Additional rules may be incorporated (into the flocking algorithm) by weighted linear combinations of biased directions at any given time-step. For instance, in order to bias a specific robot to curl around other tubes, the algorithm may take a nearest point of interest to the specified robot (e.g., another robot or location along another tube), compute a directional quaternion between that point and the specific robot, and rotate the quaternion around the resulting directional vector to the nearest point (e.g., other robot or another tube) by some weighted amount, determined by the curling bias. This algorithm may treat each robot as an agent that traverses 3D-space and that, as it travels, extends a tube behind it. Furthermore, this algorithm may subject each robot trajectory to specific fabrication constraints, including avoiding collision with the tubes that are being, or have been, fabricated. For instance, the algorithm may model a collision cone from a current robot's position. The algorithm may select the nearest direction that is collision-free and is closest to the direction determined by the soft-constraints.

In some cases, environmental information is incorporated as linear combinations of forces acting on the robots, such as repulsion from static or dynamic obstacles or tubes, attraction to various goal points, or time varying stimuli. Strict boundary conditions may be imposed, including physical robot fabrication constraints, such as maximum tilt angles and a collision cylinder around the robot. These properties may be aggregated and run through a discrete time simulator, with each robot being represented by a virtual agent, and its output trajectory corresponding to an output tube.

Table 1 illustrates parameters that may affect robot paths during fabrication and may also affect the shape of the final tubular structure.

TABLE 1

| Algorithmic parameters | Effect on robot paths | Effect on overall structure |
| --- | --- | --- |
| Number of robots | Increased interactions with neighboring robots | Determines size, build speed, and potential density |
| Starting position | Initial density | Controls density at bottom of structure |
| Adhesion | Instructs robots to approach each other | Increases potential weaving and density |
| Alignment | Steers robots in similar direction | Decreases weaving |
| Separation | Steers robots away from each other | Decreases density and weaving |
| Curling bias | Instructs robots to curl around other tubes | Controls amount/tightness of weaving in a region of space |
| Vector field | Biases tube alignment with vector field | Controls overall shapes |
| Virtual walls | A virtual surface to avoid and/or follow | Rigidly controls overall shapes |
| Max angle | Limits curve radius of a tube | Limits tightness of weave |
| Collision margin | Volume around robot to prevent collisions | Limits tightness of weave |

In some cases, with robots $R=\{r_1, \ldots, r_n\}$ and associated properties $A=\{a_1, \ldots, a_n\}$, the system may be modeled as follows. Let $a_i$ denote robot $r_i$'s set of attributes that influence the extent to which the algorithmic parameters in Table 1 take effect.

Each robot may move in a polygonal trajectory $(V_i, E_i)$, with points $V_i=\{v_1, \ldots, v_n\}$, and edges $E_i=\{e_1, \ldots, e_j\} \in V_i \times V_i$. The movement of the robot may be determined by the parameters in Table 1 and by the angle constraints of the system. Flocking parameters may be denoted by $F_{ij}(\{B\}, a_i)$, where B is the set given by the n closest elements from R and V to $r_i$ within a given threshold. For example, the curling bias may be given by $F_{icurl}(\{B\}, a_i)=q((v_{r+1}-v_r)-(v_{r-1}-V_r), \theta)(v_r-r_i)q((v_{r+1}-v_r)-(v_{r-1}-v_r), \theta)^{-1}$, where q is the quaternion from axis x and angle $\theta$ and $v_r$ is the nearest element in B to one of the $E_i$.

For a given robot position, its next position may be determined by a linear combination $d_i=\Sigma_j \lambda_j F_{ij}(\{B\}, a_i)$, for weighting scalar $\lambda$. $d_i$ may be corrected for potential collisions by generating polygonal struts from E and computing an intersection with cone from $r_i$ to $r_i+d_i$. The intersection contour may be used to adjust $d_i$, and the angle between $d_i$ and $v_n-v_{n-1}$ may be restricted by the maximum angle physically achievable by the robots.

In some cases, each robot may house one or more additional sensors to increase localization accuracy and to improve in-process collision avoidance. For instance, the additional onboard sensors may include one or more cameras, GPS (global positioning system) sensors and LIDAR (light detection and ranging) sensors, or other sensors that detect the robot's orientation or position relative to an object that is external to the robot. Adding more onboard sensors (such as lasers or cameras) may enable the robots to respond in real time to external stimuli and cues such as obstacles or environmental variables. Furthermore, sensors onboard a robot may enable the robot to respond in real-time to a collision between the robot and another object (e.g., another robot; a tube fabricated by another robot, or any other object in the environment). The control algorithm for robots with these sensors may use the same flocking-based procedure to create site-specific structures, but without pre-planning, and thus enable full autonomy in remote locations. This system may enable hierarchical tuning of fiber patterning, fiber-matrix compositions, and truss geometry to create structures adapted to their environments. For instance, in extreme environments with heavy winds, the robots may wind thicker and stronger composite fibers by simply modifying the robotic winding pattern. Robots may also weave their tubes in closer proximity to each other, creating denser and stronger overall structures.

In some cases, tubes may be in physical contact with each other and may help brace or help support each other. This co-support by tubes may result in increased load capacity, as compared to a standalone tube. In some cases, tighter tube curvatures, smaller collision radii or flexible tube segments may enable tubes to be physically touching each other.

Figure 16:
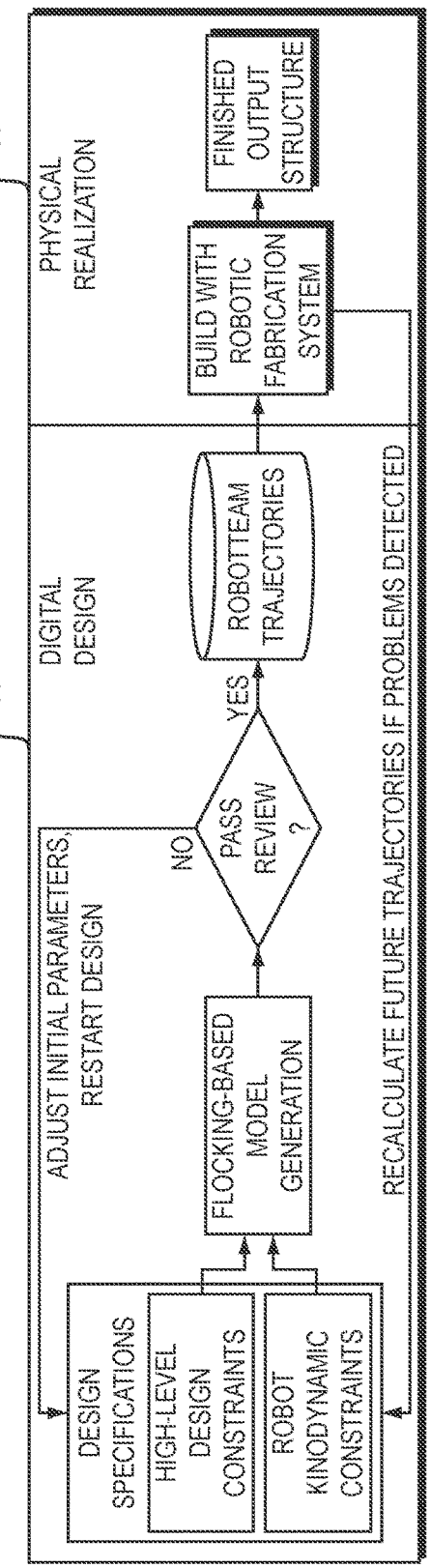
FIG. 16 is a flowchart for design and robotic fabrication of a multi-tube structure.

FIG. 16 is a flowchart for design and robotic fabrication of a multi-tube structure. The flowchart describes both design steps 1601 and steps for physical realization 1602 (e.g., robotic fabrication) of the tubes.

Prototype

The following six paragraphs describe a prototype of this invention.

In this prototype, each robot creates a single tube of desired length with controlled curvature. Each tube is constructed sequentially, segment by segment, out of a single strand of fiberglass thread and UV-curing resin. Each composite segment can be up to 90 mm in length, between 115 mm-97 mm in inner diameter, and up to 40 mm in thickness. Each segment is appended to the end of an existing tube and must overlap a previous segment to adhere to the already cured sections. Controlled curvature is achieved in the tube by tilting each segment relative to a previous segment.

In this prototype, after a series of tilts, a curvature radius as small as 0.688 meters is achievable with 90 mm long segments, and 30 mm overlapping region with the previous segment. In this prototype, it takes 18 segments of this geometry make a 90° turn.

In this prototype, the mandrel maintains a cylindrical shape while being inflated up to 115 mm in diameter. The mandrel takes 15-25 seconds to inflate to the desired range of diameters and 100 seconds to fully deflate due to the pneumatic configuration In this prototype, electronics are housed on two stacking circuit boards that are attached below the mobility sub-assembly.

In this prototype, processing on-board each robot is performed by a Teensy® 3.6 development board, using a 180 MHz ARM Cortex-M4 processor. A state machine is implemented on each robot, and states are modified by sending programmatic commands. Communications from the central computer are transmitted over wireless, using standard 802.11, to a ESP8266 chip on-board, which forwarded commands to the Teensy® board. Global orientation is tracked using fused sensor data in a quaternion format, at 100 Hz, using an Adafruit® BNO055 module. During tilt motions, this orientation provides feedback to a proportional-gain controller that adjusts the DC motor positions accordingly. A power tether runs to the ground, providing 24V, 2.5 A power to the robot. Two additional wires provide step and direction signals to a ground-level peristaltic pump stepper motor.

In this prototype, a Python GUI (graphical user interface) provides a human-readable interface to assign trajectories to robots, monitor their progress, and intervene in case of errors.

The prototype described in the preceding six paragraphs is a non-limiting example of this invention. This invention may be implemented in many other ways.

Software

In the Computer Program Listing above, nine computer program files are listed. These nine computer program files comprise software employed in a prototype implementation of this invention.

In order to submit these nine programs to the U.S. Patent and Trademark Office, the nine program files were converted to ASCII .txt format, by making changes to the file extensions of the nine programs. In each of these nine programs, these changes may be reversed, so that the nine programs may be run. Specifically, these changes may be reversed by deleting ".txt" from each filename extension and then replacing each "_" in the filename extension with a ".".

This invention is not limited to the software set forth in these nine computer program files. Other software may be employed. Depending on the particular implementation, the software used in this invention may vary.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of one or more robots, including any motors, pumps or sensors of the robots; (2) to control fabrication of a single tube by a single robot; (3) to control fabrication of multiple tubes by multiple robots in parallel or by a single robot sequentially; (4) to perform a flocking algorithm to guide robots during fabrication of multiple tubes; (5) to prevent collisions between robots; (6) to prevent collisions between a robot and a tube fabricated by another robot; (7) to receive data from, control, or interface with one or more sensors; (8) to perform any other calculation, computation, program, algorithm, or computer function described or implied herein; (9) to receive signals indicative of human input; (10) to output signals for controlling transducers for outputting information in human perceivable format; (11) to process data, to perform computations, and to execute any algorithm or software; and (12) to control the read or write of data to and from memory devices (tasks 1-12 of this sentence referred to herein as the "Computer Tasks"). The one or more computers (e.g., 1010,

1280, 1512, 1518) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Computer Readable Media

In some implementations, this invention comprises one or more computer that are programmed to perform one or more of the Computer Tasks.

In some implementations, this invention comprises one or more machine readable media, with instructions encoded thereon for one or more computers to perform one or more of the Computer Tasks.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, electronic devices (e.g., 1010, 1280, 1512, 1518) are each configured for wireless or wired communication with other devices in a network.

For example, in some cases, one or more of these electronic devices each include a wireless module for wireless communication with other devices in a network. Each wireless module (e.g., 1281) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 1010, 1280, 1512, 1518) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

As used herein, "acute angle" means an angle greater than zero degrees and less than ninety degrees.

To compute "based on" specified data means to perform a computation that takes the specified data as an input.

To "coat" a fiber with resin means to partially or entirely coat the fiber with resin. To wet a fiber with resin is a non-limiting example of "coating" the fiber with resin. "Resin-coated fiber" means fiber that is at least partially coated with fiber.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

A non-limiting example of "curing" resin is to take an action (or to create a physical condition) that causes the resin to cure or that accelerates curing of the resin. Another non-limiting example of "curing" resin is to wait until the resin cures.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

As used herein, the term "set" does not include a group with no elements.

Unless the context clearly indicates otherwise, "some" means one or more.

As used herein, a "subset" of a set consists of less than all of the elements of the set.

The term "such as" means for example.

A filament is a non-limiting example of a "thread".

To say that a machine-readable medium is "transitory" means that the medium is a transitory signal, such as an electromagnetic wave.

A non-limiting example of a "tread", as that term is used herein, is a loop (such as a track, tread or ribbon) that is configured to touch a surface while actuating motion of an object relative to the surface.

"Tube segment" means a segment of a tube.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method of fabricating a tube, wherein: (a) the fabricating comprises constructing a set of multiple tube segments of the tube; and (b) the method includes, for each specific tube segment in the set (i) inflating a cylindrical mandrel of a robot, (ii) constructing the specific tube segment by (a) winding resin-covered fiber around the mandrel while the mandrel is inflated, and (B) then curing the resin, (iii) deflating the mandrel and detaching the mandrel from the specific tube segment, and (iv) moving the robot, while the mandrel is at least partially inside the specific tube segment, in such a way that more of the robot protrudes from the specific tube segment immediately after the moving than immediately before the moving. In some cases, the method further includes, for each particular tube segment in a subset of the tube segments, tilting a central axis of the robot at an acute angle relative to the central axis of the particular tube segment, which tilting is performed after fabricating the particular tube segment and before fabricating any other tube segment. In some cases, the winding comprises revolving a nozzle of the robot around the mandrel while the resin-covered fiber exits the nozzle. In some cases, the method further involves moving the nozzle, relative to the mandrel, in a direction parallel to a cylindrical axis of the mandrel. In some cases, the method further includes actuating the moving of the robot, by pressing treads of the robot against an interior wall of the tube while each of the treads, respectively, moves in a loop around a set of rotating wheels. In some cases, the tilting causes the tube to be curved. In some cases: (a) the cylindrical mandrel has a diameter; and (b) the diameter varies during the method, with the diameter being larger when the mandrel is inflated than when the mandrel is deflated. Each of the cases described above in this paragraph is an example of the method described in the first sentence of this paragraph, and is also an example of an embodiment of this invention that may be combined with other embodiments of this invention.

In some implementations, this invention is a method comprising fabricating a set of multiple tubes, in such a way that the method includes, for each specific tube in the set: (a) inflating a cylindrical mandrel of a robot; (b) constructing a tube segment by (i) winding resin-covered fiber around the mandrel while the mandrel is inflated, and (ii) then curing the resin; (c) deflating the mandrel and detaching the mandrel from the tube segment; (d) moving the robot, while the mandrel is at least partially inside the tube segment, in such a way that more of the robot protrudes from the tube segment immediately after the moving than immediately before the moving; and (e) repeating the inflating, winding, curing, deflating, and moving in such a way as to construct multiple tube segments of the specific tube. In some cases, the method further includes, for each specific tube in the set, tilting a central axis of a specific robot at an acute angle relative to the central axis of a particular tube segment of the specific tube, which tilting is performed after the specific robot constructs the particular tube segment and before the specific robot constructs any another tube segment of the specific tube. In some cases, the fabricating comprises a single robot fabricating the multiple tubes sequentially, one tube at a time. In some cases: (a) the fabricating comprises multiple robots simultaneously fabricating the multiple tubes; and (b) each of the tubes is fabricated by only one of the robots. In some cases, the method further comprises controlling orientation, in a first coordinate system, of each of the multiple robots while the robots fabricate the multiple tubes. In some cases, the controlling orientation includes performing an algorithm that takes, as inputs, position, in the first coordinate system, of each of the multiple robots and of previously fabricated tube segments. In some cases, the method includes, for each specific robot in the multiple robots, converting orientation of the specific robot in the first coordinate system into orientation of the specific robot in a second coordinate system, which second coordinate system is employed only for the specific robot and not for any other robot in the multiple robots. Each of the cases described above in this paragraph is an example of the method described in the first sentence of this paragraph, and is also an example of an embodiment of this invention that may be combined with other embodiments of this invention.

In some implementations, this invention is a system comprising a set of multiple robots, wherein each specific robot, in the set of robots, comprises (a) an inflatable, cylindrical mandrel; (b) a pneumatic pump; (c) a first mechanism that includes a nozzle, a tube, and a support structure; and (d) a first motor; in which specific robot (i) the support structure is configured to support weight of the nozzle and to guide fiber to the nozzle, (ii) the tube is configured to deliver resin to the nozzle, (iii) the nozzle is configured to cause the resin to coat the fiber and to allow the fiber, after being coated with resin, to exit the nozzle, (iv) the first mechanism is configured to undergo rotation about the cylindrical axis of the mandrel, (v) the first motor is configured to actuate the rotation and to thereby cause the nozzle to revolve around the mandrel while the fiber exits the nozzle, and (vi) the pneumatic pump is configured to inflate the mandrel in such a way that the mandrel is inflated during a time period in which (A) the nozzle revolves around the mandrel and (B) the fiber exits the nozzle and is wound around the mandrel. In some cases: (a) the system includes a second motor; and (b) the second motor is configured to actuate linear motion of the first mechanism in a direction parallel to the cylindrical axis of the mandrel. In some cases: (a) the system further comprises treads and an additional set of motors, which additional set of motors does not include the first motor and does not include the second motor; and (b) the additional set of motors is configured to actuate motion of the treads. In some cases, the system further comprises a computer that is programmed to control the multiple robots in such a way that: (a) the multiple robots simultaneously fabricate multiple tubes; and (b) each of the tubes is fabricated by only one of the robots. In some cases, the computer is programmed to perform an algorithm that controls orientation of each of the multiple robots while the robots fabricate the multiple tubes. In some cases, the computer is programmed in such a way that the algorithm takes, as inputs, position of each of the multiple robots and of previously fabricated tube segments. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method of fabricating a tube, wherein:
   (a) the fabricating comprises constructing a set of multiple tube segments of the tube; and
   (b) the method includes, for each specific tube segment in the set
   (i) inflating a cylindrical mandrel of a robot,
   (ii) constructing the specific tube segment by (A) winding resin-covered fiber around the mandrel while the mandrel is inflated, and (B) then curing the resin,
   (iii) deflating the mandrel and detaching the mandrel from the specific tube segment, and
   (iv) moving the robot, while the mandrel is at least partially inside the specific tube segment, in such a way that more of the robot protrudes from the specific tube segment after the moving than before the moving.

2. The method of claim 1, wherein the method further includes, for each particular tube segment in a subset of the tube segments, tilting a central axis of the robot at an acute angle relative to the central axis of the particular tube segment, which tilting is performed after fabricating the particular tube segment and before fabricating any other tube segment.

3. The method of claim 1, wherein the winding comprises revolving a nozzle of the robot around the mandrel while the resin-covered fiber exits the nozzle.

4. The method of claim 3, wherein the method further involves moving the nozzle, relative to the mandrel, in a direction parallel to a cylindrical axis of the mandrel.

5. The method of claim 1, wherein the method further includes actuating the moving of the robot, by pressing treads of the robot against an interior wall of the tube while each of the treads, respectively, moves in a loop around a set of rotating wheels.

6. The method of claim 2, wherein the tilting causes the tube to be curved.

7. The method of claim 1, wherein:
(a) the cylindrical mandrel has a diameter; and
(b) the diameter varies during the method, with the diameter being larger when the mandrel is inflated than when the mandrel is deflated.

8. A method comprising fabricating a set of multiple tubes, in such a way that the method includes, for each specific tube in the set:
(a) inflating a cylindrical mandrel of a robot;
(b) constructing a tube segment by (i) winding resin-covered fiber around the mandrel while the mandrel is inflated, and (ii) then curing the resin;
(c) deflating the mandrel and detaching the mandrel from the tube segment;
(d) moving the robot, while the mandrel is at least partially inside the tube segment, in such a way that more of the robot protrudes from the tube segment after the moving than before the moving; and
(e) repeating the inflating, winding, curing, deflating, and moving in such a way as to construct multiple tube segments of the specific tube.

9. The method of claim 8, wherein the method further includes, for each specific tube in the set, tilting a central axis of a specific robot at an acute angle relative to the central axis of a particular tube segment of the specific tube, which tilting is performed after the specific robot constructs the particular tube segment and before the specific robot constructs any another tube segment of the specific tube.

10. The method of claim 8, wherein the fabricating comprises a single robot fabricating the multiple tubes sequentially, one tube at a time.

11. The method of claim 8, wherein:
(a) the fabricating comprises multiple robots simultaneously fabricating the multiple tubes; and
(b) each of the tubes is fabricated by only one of the robots.

12. The method of claim 11, wherein the method further comprises controlling orientation, in a first coordinate system, of each of the multiple robots while the robots fabricate the multiple tubes.

13. The method of claim 12, wherein the controlling orientation includes performing an algorithm that takes, as inputs, position, in the first coordinate system, of each of the multiple robots and of previously fabricated tube segments.

14. The method of claim 12, wherein the method includes, for each specific robot in the multiple robots, converting orientation of the specific robot in the first coordinate system into orientation of the specific robot in a second coordinate system, which second coordinate system is employed only for the specific robot and not for any other robot in the multiple robots.

* * * * *